United States Patent
Takeda et al.

(10) Patent No.: US 6,542,202 B2
(45) Date of Patent: *Apr. 1, 2003

(54) VIDEO SIGNAL PROCESSING APPARATUS IMPROVING SIGNAL LEVEL BY AGC AND FRAME ADDITION METHOD

(75) Inventors: Mitsuhiko Takeda, Funabashi (JP); Mamoru Oda, Noda (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/376,176

(22) Filed: Aug. 17, 1999

(65) Prior Publication Data

US 2003/0001975 A1 Jan. 2, 2003

(30) Foreign Application Priority Data

Sep. 30, 1998 (JP) ......................................... 10-27684(P)

(51) Int. Cl.[7] .......................... H04N 5/52; H04N 5/228; H04B 17/02; H04B 7/00
(52) U.S. Cl. ....................... 348/678; 348/679; 348/683; 348/222; 348/229; 348/255; 455/136; 455/138; 455/240.1; 455/245.1
(58) Field of Search ................................ 348/678, 679, 348/229, 255, 256, 683, 685, 222; 455/136, 138, 240.1, 245.1

(56) References Cited

U.S. PATENT DOCUMENTS

| | | | | |
|---|---|---|---|---|
| 4,292,598 A | * | 9/1981 | Yasumura ..................... 330/281 |
| 4,819,075 A | | 4/1989 | Imaide et al. ............. 358/213.8 |
| 4,860,091 A | * | 8/1989 | Kimura et al. ................. 358/22 |
| 5,049,995 A | * | 9/1991 | Shimoni ..................... 358/211 |
| 5,379,075 A | * | 1/1995 | Nagasawa et al. .......... 348/678 |
| 5,420,629 A | * | 5/1995 | Watanabe .................... 348/207 |
| 5,448,306 A | * | 9/1995 | Koyama ..................... 348/678 |
| 5,512,948 A | * | 4/1996 | Iwamatsu ................... 348/255 |
| 5,541,650 A | * | 7/1996 | Kondo ........................ 348/229 |
| 5,614,948 A | | 3/1997 | Hannah ....................... 348/255 |
| 5,737,033 A | * | 4/1998 | Masuda ...................... 348/678 |
| 5,867,228 A | * | 2/1999 | Miki et al. .................. 348/624 |
| 5,884,153 A | * | 3/1999 | Okada ..................... 455/243.1 |
| 5,926,216 A | * | 7/1999 | Nobuoka .................... 348/297 |

FOREIGN PATENT DOCUMENTS

| | | |
|---|---|---|
| JP | 5 91395 | 4/1993 |
| JP | 5344417 | 12/1993 |

OTHER PUBLICATIONS

Patent Abstract of Japan, 06 326917, Nov. 25, 1994.
Patent Abstract of Japan, 04 170874, Jun. 18, 1992.
Patent Abstract of Japan, 04 065977, Mar. 2, 1992.

* cited by examiner

*Primary Examiner*—John Miller
*Assistant Examiner*—Paulos Natnael
(74) *Attorney, Agent, or Firm*—Birch, Stewart, Kolasch & Birch, LLP

(57) ABSTRACT

A video signal processing apparatus capable of improving signal level while reducing noise component no matter a video signal of what illuminance is input is provided, which apparatus includes a video signal amplifying circuit amplifying an input video signal and outputting a video signal of a predetermined image size in accordance with a gain control coefficient, a frame addition circuit connected to the video signal amplifying circuit for adding outputs of the video signal amplifying circuit by a predetermined number of frames, a first signal level detecting circuit connected to the video signal amplifying circuit and calculating the gain control coefficient and a multiplication coefficient in accordance with an output of the video signal amplifying circuit, and a first multiplier connected to the frame addition circuit and the first signal level detecting circuit and receiving as inputs an output of the frame addition circuit and the multiplication coefficient.

13 Claims, 12 Drawing Sheets

VIDEO SIGNAL PROCESSING APPARATUS IMPROVING SIGNAL LEVEL BY AGC AND FRAME ADDITION METHOD

BACKGROUND OF THE INVENTION

1. Field of the Invention

The present invention relates to a video signal processing apparatus and, more particularly, to a video signal processing apparatus improving image quality when illuminance is low.

2. Description of the Background Art

When an image is picked up by a video terminal having a camera device using an image pickup device such as a CCD (Charge Coupled Device) under low illuminance condition, for example indoors or at night outside, video images picked up by the camera device may be extremely dark or suffer from much noise.

The picked up video images become extremely dark as sensitivity of the image pickup device such as the CCD employed in the camera device is low. As semiconductors have been developed to be smaller and smaller recently, the CCD has also been reduced in size, and hence the number of signal electrons handled by one pixel has been reduced. Therefore, the output level of the CCD for an image picked up under dark condition becomes small, resulting in low sensitivity.

The cause of extremely conspicuous noise is that shot noise generated at the time of photoelectric conversion becomes innegligible, as the number of signal electrons per pixel has been reduced.

The following methods have been conventionally known as effective in improving sensitivity.

a) To enlarge aperture ratio of iris.
b) To set shutter speed slower and to make exposure time longer.
c) To improve signal level by signal processing such as AGC (Auto Gain Control).
d) To improve signal level by signal processing through frame addition method.

As to the method a), that is, to increase aperture ratio of an iris, the larger the aperture ratio, the larger lens must be mounted. When an image is picked up under bright condition, a camera sensor would be saturated when the aperture ratio is large. Therefore, there is a limit in increasing the aperture ratio.

When automatic iris mechanism is mounted on the lens, the lens body will be increased in size, and the cost is also increased. Therefore, for a video terminal of which cost or power consumption is of priority, a fixed iris having relatively small aperture ratio must be used.

As to the method b), most of the image pickup devices such as the CCD allows free adjustment of shutter speed, by variable electronic shutter control. When an NTSC (National Television System Committee) video signal is to be generated, there is a limit of shutter speed in accordance with NTSC standard, which requires video signals of thirty (30) frames per second. Therefore, most image pickup devices allow control of shutter speed to the minimum (longest exposure time) of 1/30 sec.

A specific example of the prior art utilizing the method c) is shown in FIG. 15. Referring to FIG. 15, an AGC circuit includes a GCA (Gain Control Amplifier) circuit 1 connected to an output of D/A (Digital to Analog) converter 4, which will be described later, an A/D (Analog to Digital) converter 2 connected to an output of GCA circuit 1, a signal level detecting circuit 47 connected to an output of A/D converter 2, and a D/A converter 4 connected to an output of signal level detecting circuit 47.

A video signal output from an image pickup device is first input to GCA circuit 1, as an input signal to AGC circuit. GCA circuit 1 amplifies the input video signal, in accordance with a gain control signal G1', which will be described later, obtained from D/A converter 4.

The amplified video signal is input to A/D converter 2 and converted to a digital video signal. The video signal which has been converted to the digital video signal is output as an output video signal of AGC circuit.

The output video signal is at the same time supplied to signal level detecting circuit 47. Signal level detecting circuit 47 detects the level of the present video signal, from the output video signal.

The result of level detection is input to D/A converter 4 as a gain control coefficient K1'. D/A converter 4 converts gain control coefficient K1' to an analog control signal, and provides the gain control signal G1'.

The output gain control signal G1' is fed back to GCA circuit 1, and automatic gain control takes place.

Referring to FIG. 16, the change in gain control coefficient K1' output from signal level detecting circuit 47 when illuminance gradually changes from high (blight) to low (dark) will be described.

When the illuminance is high, the signal level is high, and therefore a small gain control coefficient K1'=min is output to provide low gain.

As the illuminance gradually lowers, the signal level becomes higher, and therefore gain control coefficient gradually increases to K1'=max to attain higher gain.

When the luminance attains still lower (darker) after gain control coefficient K1' attains to K1'=max, the maximum value of gain control coefficient K1'=max is maintained. Therefore, the signal level becomes lower.

As to the method d), that is, frame addition method, Japanese Patent Laying-Open No. 5-344417 entitled "High Sensitivity Camera" proposes a video signal processing apparatus which improves output level of the image pickup device under low illuminance.

Referring to FIG. 17, a frame addition circuit constituting a part of a conventional video signal processing apparatus includes an A/D converter 2, an image memory 5 connected to an output of A/D converter 2, and an adder 6 connected to image memory 5 and to an output of A/D converter 2.

The video signal output from the image pickup device is first input to A/D converter 2. A/D converter 2 converts the input video signal to a digital video signal, and outputs the digital video signal to image memory 5 and adder 6. Image memory 5 has a storage capacity of one frame, and operates as a one frame delay circuit. The video signal delayed by one frame and the present video signal not delayed, output from A/D converter 2 are input to adder 6 and added to each other. The added video signal is output as an output video signal of the frame addition circuit.

The AGC circuit implementing the method c) shown in FIG. 15 is capable of amplifying a video signal of a very low level picked up with low illuminance always to a constant level, by automatic gain control in accordance with the present video signal level. Therefore, the AGC circuit has been used in many video terminals.

When a video signal of a very low level picked up with low illuminance is amplified with high gain, however, shot noise is also amplified, which means that the noise component is increased, degrading S/N (signal/noise) ratio.

Further, the frame addition circuit implementing the method d) shown in FIG. 17 provides video signals of twice the amplitude level, as a video signal delayed by one frame and a present video signal not delayed are added.

Further, the noise component is a shot noise with low frame correlation. Therefore, when frames with noise components are added, in most cases the addition is between a pixel with noise component and another pixel without noise component. Therefore, the original video signal is doubled by addition, while noise component is not added but averaged in the added two frames. Therefore, noise component level can be suppressed to some extent.

As still images are added and averaged, the signal to noise ratio S/N of each image can be improved in the following manner.

Generally, the S/N ratio of an optical system is represented by the following equation.

$$\frac{S}{N} = \frac{\text{signal }(P, M)}{\text{quantum noise }(P, M) + \text{thermal noise} + \text{system noise}}$$

Namely, the signal and the quantum noise are increased in accordance with the input photoelectric power P and the sensor magnification M. On the other hand, thermal noise is not dependent thereon.

Accordingly, thermal noise is negligible when an image is picked up using a sensor having high magnification with sufficient optical input.

When the optical input is weak (dark), however, these noises cannot be entirely neglected.

The reason for this is as follows. The quantum noise (shot noise) has statistical fluctuation, as the incident light has the nature of particles.

The fluctuation has Poisson distribution, and when an average value of the number of photons incident on one pixel is represented as n, standard deviation is given by $\sqrt{n}$, which represents fluctuation, or noise. Accordingly, the following definition is given.

$$\frac{S}{N} = \frac{\text{average value}}{\text{standard deviation}} = \frac{n}{\sqrt{n}} = \sqrt{n}$$

Accordingly, when the number of photons is increased, that is, when integration (addition) is performed, n increases, and hence S/N ratio increases accordingly.

Addition and averaging of thermal noise is considered addition of sources of mutually not correlated noises in normal distribution (correlation coefficient y=0), and noise power is added directly.

The system noise refers to the noise inherent to the system such as quantum noise introduced by A/D converter, and the system noise has different nature dependent on the cause of generation. Therefore, general discussion is impossible.

As to the quantum noise mentioned above, by AGC, signal intensity can be made uniform, and therefore quantum noise derived from A/D converter, for example, can be suppressed.

By addition (averaging) described above, noise corresponding to quantum noise can be reduced.

The noise component itself, however, still exists, and therefore when the degree of image quality degradation in terms of S/N ratio is monitored for a prescribed time period, for example over several seconds, improvement in S/N ratio cannot be attained as in the case of AGC circuit of c).

In other words, the effect of improvement is not observed when continuous images are viewed as a whole.

When the level improvement of twice or more is to be attained by the frame addition circuit, an image memory 7 and an adder 8 are added, as shown in FIG. 18. In this manner, a video signal delayed by two frames, a video signal delayed by one frame and the present video signal not delayed are added, so that a video signal having three times the amplitude level is obtained.

By adding a video signal preceding one frame further, it is possible to obtain a video signal of which magnification is increased to 2, 3, 4 . . . . What can be attained, however, is only the level improvement of integer multiple, and multistep control performed on tones of which accuracy is determined by the number of bits of D/A converter as in AGC circuit of c) is impossible. Therefore, what is attained is always level improvement to a prescribed extent only.

SUMMARY OF THE INVENTION

The present invention was made to solve the above described problems and its object is to provide a video signal processing apparatus capable of improving signal level while reducing noise component by a process of adding and averaging frames, no matter a video signal of what illuminance is input.

Another object of the present invention is to provide a video signal processing apparatus capable of improving signal level while reducing noise component by a process of adding and averaging lines and frames, no matter a video signal of what illuminance is input.

A still further object of the present invention is to provide a video signal processing apparatus capable of improving signal level while reducing noise component, no matter a scaled video signal of what illuminance is input.

A still further object of the present invention is to provide a video signal processing apparatus capable of optimal control of filter parameter for noise reduction, no matter a video signal of what illuminance is input.

According to an aspect of the present invention, a video signal processing apparatus includes: a video signal amplifying circuit amplifying an input video signal and outputting a video signal of a predetermined image size in accordance with a gain control coefficient; a frame addition circuit connected to the video signal amplifying circuit for adding by a predetermined number of frames, the outputs of the video signal amplifying circuit; a first signal level detecting circuit connected to the video signal amplifying circuit, for calculating the gain control coefficient and a multiplication coefficient in accordance with an output of the video signal amplifying circuit; and a first multiplier connected to the frame addition circuit and the first signal level detecting circuit, receiving as inputs the output of the frame addition circuit and the multiplication coefficient.

The gain control coefficient and the multiplication coefficient are calculated in accordance with the brightness of the video signal. Therefore, when a video signal which is within a relatively bright illuminance range is input, adding and averaging process is performed by the frame addition circuit and the multiplier. Thus noise component is reduced. When a video signal which is within a relatively dark illuminance range is input, the multiplication coefficient is increased as the signal level of the video signal decreases. Thus the process of adding and averaging frames is performed, so that the signal level can be improved while the noise component is reduced. When a video signal which is within darker illuminance range is input, the multiplication coefficient is made closer to 1 to perform the process of adding faces. Thus the signal level is improved.

Preferably, the frame addition circuit includes: a line memory connected to the video signal amplifying circuit for video signals of one line; a video memory connected to the video signal amplifying circuit for video signals of one frame; a first adder connected to the video signal amplifying circuit and the line memory and receiving as inputs an output of the video signal amplifying circuit and the video signals stored in the line memory; and a second adder connected to the first adder and the image memory and receiving as inputs an output of the first adder and the video signals stored in the image memory.

The gain control coefficient and the multiplication coefficient are calculated in accordance with the brightness of the video signal. Therefore, when a video signal which is within a relatively blight illuminance range is input, adding and averaging processes between lines and between frames are performed by the first and second addition circuits and the multiplier. Thus, noise component is reduced. When a video signal which is within a relatively dark illuminance range is input, the multiplication coefficient is increased as the signal level of the video signal decreases. Thus adding and averaging processes between lines and between frames are performed, so that the signal level can be improved while the noise component is reduced. When a video signal which belongs to darker illuminance range is input, the multiplication coefficient is made closer to 1, and adding processes between lines and between frames are performed. Thus, signal level is improved.

More preferably, the video signal amplifying circuit includes: an amplifying circuit for amplifying the input video signal; and a first scaling circuit connected to the amplifying circuit for scaling an image data constituted by the outputs of the amplifying circuit at a prescribed magnification. The frame addition circuit includes: a first image memory connected to the first scaling circuit and storing a predetermined number of outputs of the first scaling circuit; and an accumulation adder for accumulating and adding the output of the first scaling circuit and the prescribed number of outputs of the first scaling circuit stored in the first image memory.

The gain control coefficient and the multiplication coefficient are calculated in accordance with the brightness of the video signal. The video signal is scaled by a predetermined magnification, by the first scaling circuit. Therefore, when a video signal within a relatively bright illuminance range is input, adding and averaging process among a predetermined number of frames is performed by the accumulation adder. Thus, noise component is reduced. When a video signal within a relatively dark illuminance range is input, the multiplication coefficient is made larger as the signal level of the video signal decreases. Thus, adding and averaging process between frames is performed, so that the signal level can be improved while the noise component is reduced. When a video signal of a darker illuminance range is input, the multiplication coefficient is made closer to 1, and accumulation and adding process between frames is performed. Thus the signal level is improved.

More preferably, the first signal level detecting circuit includes a second signal level detecting circuit connected to the video signal amplifying circuit and calculating the gain control coefficient, the multiplication coefficient and a first filter parameter coefficient in accordance with an output of the video signal amplifying circuit. The video signal processing circuit further includes a noise reduction circuit connected to the first multiplier and to the second signal level detecting circuit and performing noise reduction of an output of the first multiplier in accordance with the first filter parameter coefficient and the output of the first multiplier.

The first filter parameter coefficient is calculated in accordance with the brightness of the video signal. More specifically, when a video signal within a relatively bright illuminance range is input, the first filter parameter coefficient is calculated such that by the amount of reduction of the noise component realized by the adding and averaging process, filter parameter of the noise reduction circuit is weakened. In a relatively dark illuminance range, the first filter parameter coefficient is calculated such that the filter parameter of the noise reduction circuit is gradually increased as the effect of noise component reduction attained by the adding and averaging process decreases. In a darker illuminance range, the first filter parameter coefficient is calculated to maximize the filter parameter of the noise reduction circuit. In this manner, the filter parameter of the noise reduction circuit is automatically controlled, realizing optimal noise reduction of the video signal.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
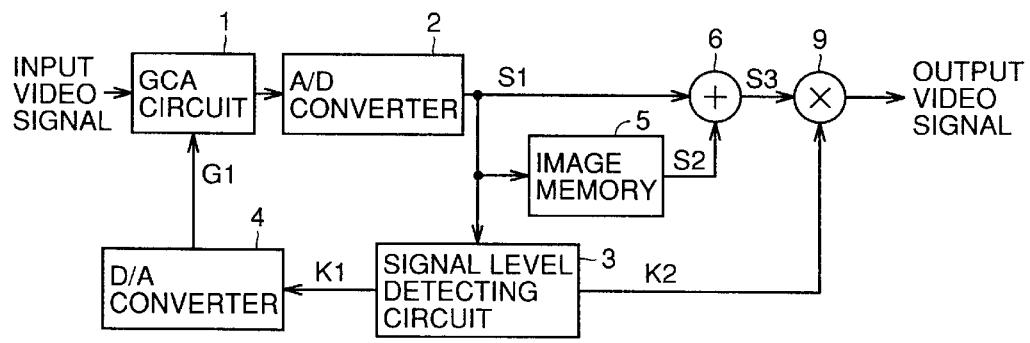
FIG. 1 represents a configuration of a video signal processing apparatus in accordance with a first embodiment of the present invention.

Referring to FIG. 1, the video signal processing apparatus in accordance with the first embodiment includes: a GCA circuit 1 amplifying an input video signal; an A/D converter 2 connected to an output of GCA circuit 1 and converting the amplified video signal to a digital video signal; a signal level detecting circuit 3 connected to an output of A/D converter 2, detecting present video signal level, and generating gain control coefficient K1 and multiplication coefficient K2; a D/A converter 4 connected to an output of signal level detecting circuit 3 and converting gain control coefficient K1 to an analog control signal; an image memory 5 connected to an output of A/D converter 2, having a storage capacity of one frame and operating as a one frame delay circuit; an adder 6 connected to an output of A/D converter 2 and to image memory 5, and adding the video signal delayed by one frame and the present video signal not delayed, output from A/D converter 2; and a multiplier 9 connected to an output of adder 6 and an output of signal level detecting circuit 3, and multiplying the added video signal by multiplication coefficient K2.

The video signal output from an image pickup device is first input to GCA circuit 1 as an input video signal. GCA circuit 1 amplifies the input video signal by a gain control signal G1 obtained from D/A converter 4, which will be described later.

The amplified video signal is input to A/D converter 2, converted to a digital video signal, and output as a video signal S1. Video signal S1 which has been converted to a digital video signal is output to image memory 5 and to adder 6.

Video signal S1 output at this time is also supplied to signal level detecting circuit 3. Signal level detecting circuit 3 detects the present video signal level from video signal S1 output from A/D converting circuit 2.

The result of level detection is input as gain control coefficient K1 to D/A converter 4. D/A converter 4 converts gain control coefficient K1 to an analog control signal and provides a gain control signal G1.

The output gain control signal G1 is fed back to GCA circuit 1, and automatic gain control is performed.

Image memory 5 has a storage capacity of one frame and operates as a one frame delay circuit.

A video signal S2 delayed by one frame and the not delayed present video signal S1 output from A/D converting circuit 2 are input to adder 5 and added together. The resulting video signal S3 is input to multiplier 9.

Multiplication coefficient K2 output from signal level detecting circuit 3 is input to multiplier 9, the added video signal S3 is multiplied by multiplication coefficient K2, and the result of multiplication is output as an output video signal.

Figure 2:
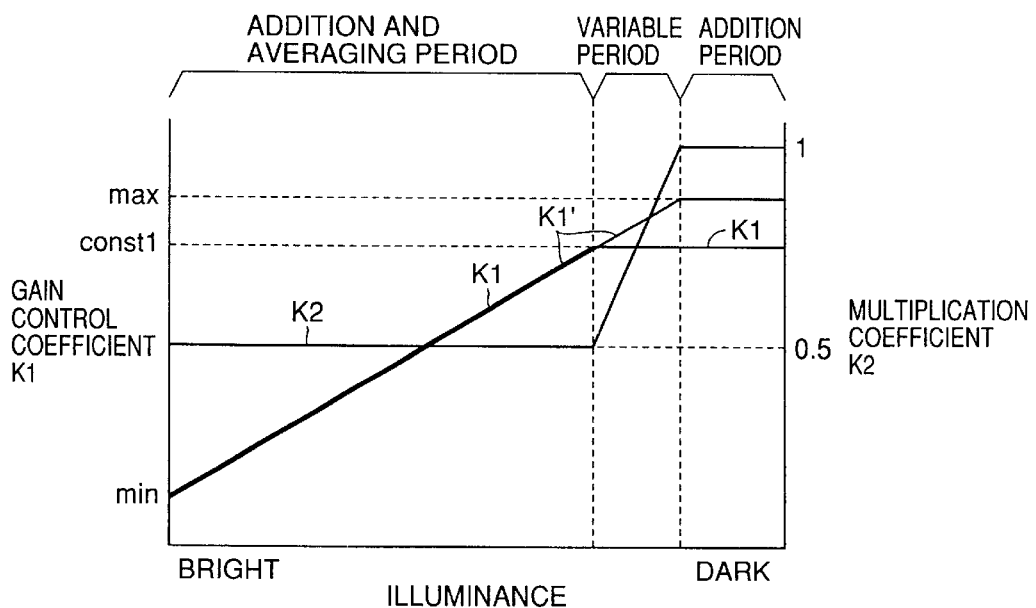
FIG. 2 represents changing characteristics of gain control coefficient K1 and multiplication coefficient K2 generated by signal level detecting circuit 3 with respect to illuminance, in the video signal processing apparatus in accordance with the first embodiment of the present invention.

Referring to FIG. 2, coefficients output from signal level detecting circuit 3 will be described. FIG. 2 also shows a coefficient curve of gain control coefficient K1' when the video signal is amplified only by the AGC circuit described with respect to the background art.

Gain control coefficient K1 for controlling the gain of GCA circuit 1 changes in the similar manner as the coefficient curve of gain control coefficient K1' obtained when the video signal is amplified only by the AGC circuit, to a certain brightness, when the brightness gradually changes from bright to dark.

The certain brightness refers to that brightness at which the signal level attains twice the signal level amplifiable with gain control coefficient K1' being max, and the gain control coefficient K1 at that time is K1=const1, as can be seen from FIG. 2.

Even when the illuminance becomes darker from here, gain control coefficient K1=const1 is maintained, and therefore the signal level attains lower.

Next, the change in multiplication coefficient K2, which is multiplexed by the video signal S3 which results from addition by adder 6 and is input to multiplier 9, when the illuminance gradually changes from bright to dark will be described.

To a certain brightness, multiplication coefficient is not changed but constant at K2=0.5. The multiplication coefficient K2=0.5 means ½. Namely, this coefficient represents addition and averaging process performed by adder 6 and multiplier 9, and the period in which the coefficient is kept constant will be referred to as addition and averaging period.

The certain brightness refers to that brightness at which gain control coefficient K1=const1, as can be seen from FIG. 2.

As the illuminance becomes darker from here, multiplication coefficient K2 increases, until multiplication coefficient K2 attains 1 when a signal level detected by signal level detecting circuit 3 attains to a certain constant value.

Figure 15:
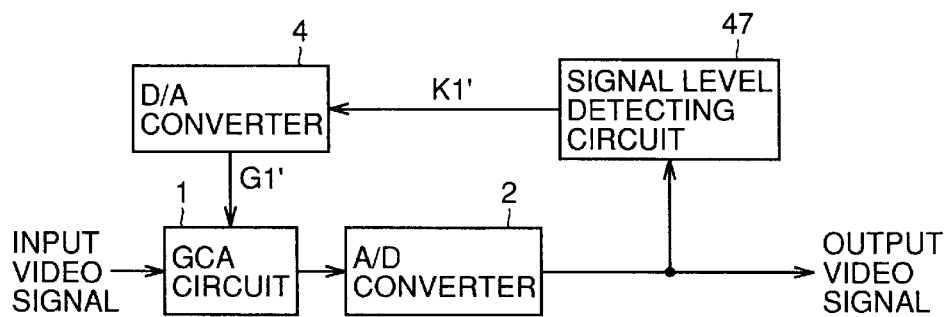
FIG. 15 shows a configuration of a conventional video signal processing apparatus.
Figure 16:
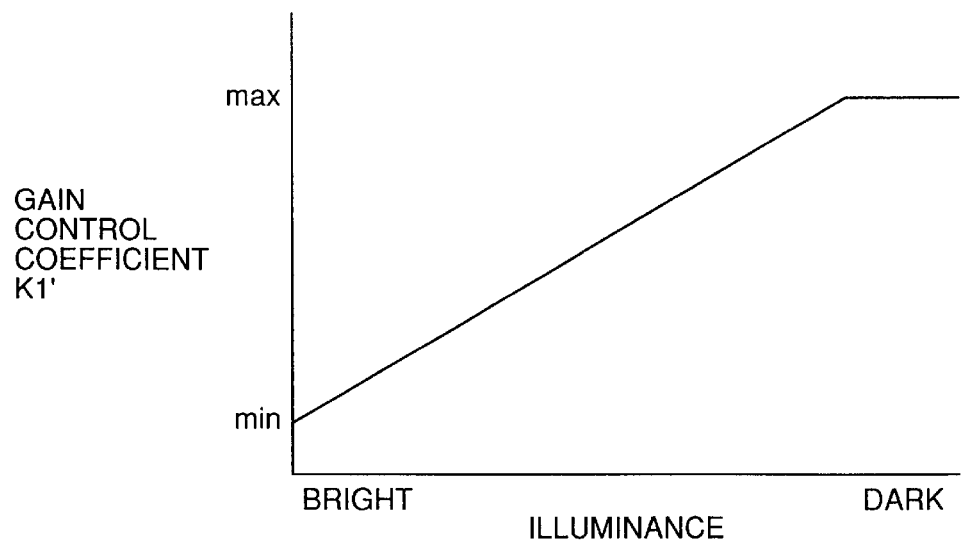
FIG. 16 shows a changing characteristic of the gain control coefficient K1' generated by the signal level detecting circuit 3 with respect to illuminance, of the conventional video signal processing apparatus.
Figure 17:
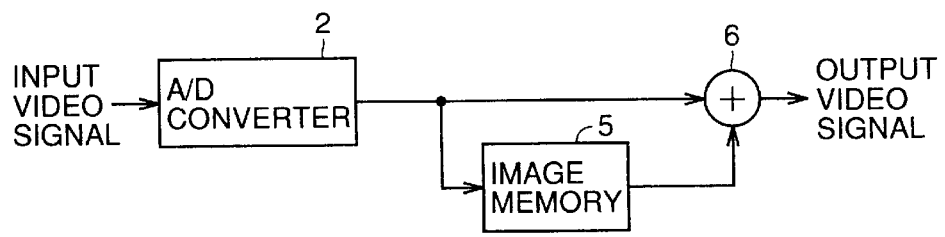
FIG. 17 shows another configuration of the video signal processing apparatus in accordance with the prior art.
Figure 18:
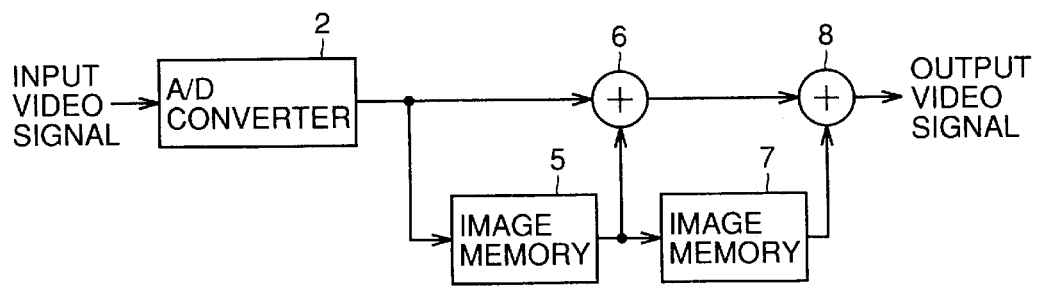
FIG. 18 shows a still further configuration of the video signal processing apparatus in accordance with the prior art.

The time when "the signal level detected by the signal level detecting circuit 3 attains to a certain constant value" refers to the time when the gain control coefficient K1' when the video signal is amplified only by the AGC circuit shown in FIG. 15 attains to K1'=max, as is apparent from FIG. 2.

The multiplication coefficient K2 is variable from 0.5 to 1, and therefore this period is referred to as variable period.

When the brightness becomes still darker, multiplication coefficient K2 is maintained constant at K2=1, and multiplication coefficient K2 does not change any more even when the illuminance becomes darker.

That the multiplication coefficient K2 is K2=1 means that the signal level is not changed by multiplier 9 and only the addition process of two frames is performed by adder 6. Therefore, this period is referred to as addition period.

In the addition and averaging period, the signal level is kept constant as the gain control coefficient K1 changes, and noise component is reduced as the adding and averaging process among frames is performed by adder 6 and multiplier 9.

In the variable period, gain control coefficient K1 is constant and amplification rate is not changed. Therefore, as the illuminance becomes darker, the signal level decreases. However, the noise component is not amplified.

As multiplication coefficient K2 changes between 0.5 and 1, noise component is reduced and the signal level is improved, as adding and averaging process among frames is performed.

In the addition period, addition of frames is performed, and therefore signal level twice that before the addition process is obtained, and thus improvement is achieved.

As described above, in the video signal processing apparatus in accordance with the first embodiment, in a relatively bright illuminance range, adding and averaging process among frames is performed, whereby noise component is reduced.

In a relatively dark illuminance range, adding and averaging process among frames is performed, whereby noise component is reduced and the signal level is improved.

In a darker illuminance range, addition among frames is performed, whereby the signal level is improved.

In this manner, the video signal level is enhanced twice, and the noise component generated in that video signal can be reduced, whereby good image quality is ensured.

Second Embodiment

Figure 3:
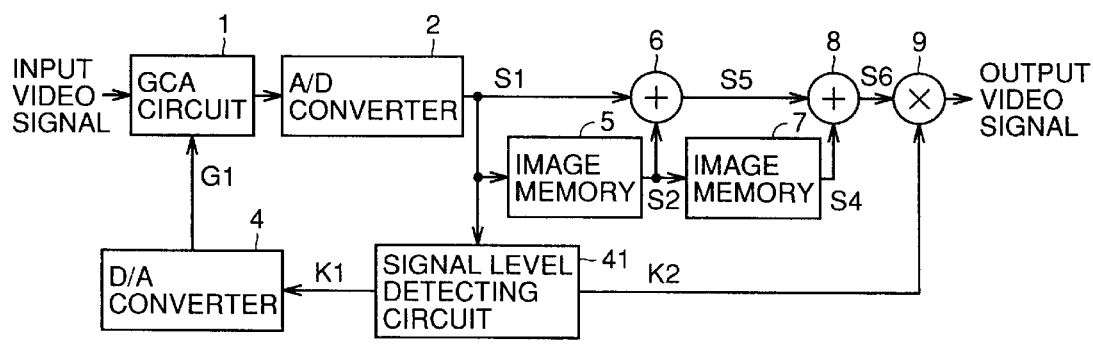
FIG. 3 shows another configuration of the video signal processing apparatus in accordance with a second embodiment of the present invention.

Referring to FIG. 3, the video signal processing apparatus in accordance with the second embodiment will be described.

Portions similar to those of the first embodiment are denoted by the same reference characters and description thereof is not repeated.

As can be seen from FIG. 3, the configuration of the video signal processing apparatus differs from that of the first embodiment in that the configuration additionally includes an image memory 7 having a storage capacity of one frame and operating as a delay circuit for further delaying by one frame the video signal S2 which has been delayed by image memory 5, and an adder 8 for adding a video signal S4 delayed by two frames by image memory 7 with a video signal S5 which is a result of addition of one frame delayed video signal S2 and not delayed present video signal S1 output from adder 6. Further, in place of signal level detecting circuit 3, a signal level detecting circuit 41 is used.

Image memory 7 has a storage capacity of one frame as image memory 5, and operates as a one frame delay circuit.

Image memory 7 further delays by one frame video signal S2 which has been already delayed by one frame by image memory 5. Video signal S4 delayed by two frames by image memory 7, and video signal S5 output from adder 6 which is a result of addition of one frame delayed video signal S2 and not delayed present video signal S1 output from A/D converter circuit 2, are input to adder 8 and added together.

A video signal S6 which is a result of addition by adder 8 is input to multiplier 9. Multiplication coefficient K2 output from signal level detecting circuit 41 is input to multiplier 9, video signal S6 is multiplied by multiplication coefficient K2, and the result is provided as an output video signal.

Coefficients output from signal level detecting circuit 41 will be described with reference to FIG. 4. A coefficient curve of gain control coefficient K1' described with respect to the background art is also shown, as in FIG. 2.

Gain control coefficient K1 for controlling the gain of GCA circuit 1 changes in the similar manner as the coefficient curve of gain control coefficient K1' obtained when the video signal is amplified only by the AGC circuit, to a certain brightness, when the brightness gradually changes from bright to dark.

Figure 4:
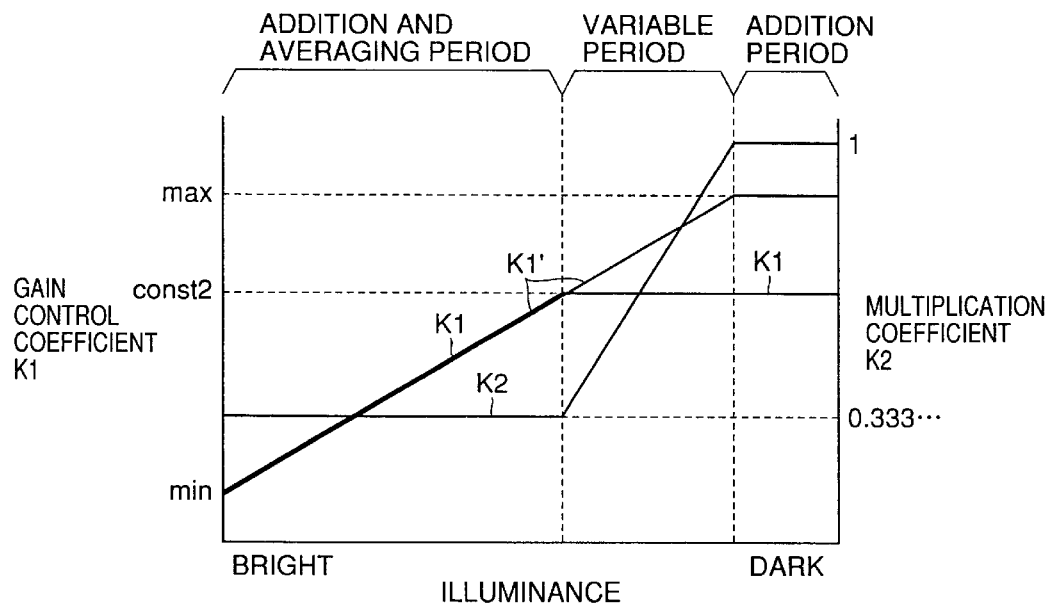
FIG. 4 represents changing characteristics of gain control coefficient K1 and multiplication coefficient K2 generated by the signal level detecting circuit 3 with respect to illuminance, in the video signal processing apparatus in accordance with the second embodiment of the present invention.

The certain brightness refers to that brightness at which the signal level attains three times the signal level amplifiable with gain control coefficient K1 being max, and the gain control coefficient K1 at that time is K1=const2, as can be seen from FIG. 4.

Even when the illuminance becomes darker from here, gain control coefficient K1=const2 is maintained, and therefore the signal level attains lower.

Next, the change in multiplication coefficient K2 which is input to multiplier 9 and is multiplexed by the video signal S6, when the illuminance gradually changes from blight to dark will be described.

To a certain brightness, multiplication coefficient is not changed but constant at K2=0.333 . . . . The multiplication coefficient K2 0.333 . . . means ⅓. Namely, this coefficient represents addition and averaging process performed by adders 6 and 8 and multiplier 9, and the period in which the coefficient is kept constant will be referred to as addition and averaging period, as in the case of FIG. 2.

The certain brightness refers to that brightness at which gain control coefficient K1=const2, as can be seen from FIG. 4.

As the illuminance becomes darker from here, multiplication coefficient K2 increases, until multiplication coefficient K2 attains 1 when a signal level detected by signal level detecting circuit 41 attains to a certain constant value.

The time when "the signal level detected by the signal level detecting circuit 41 attains to a certain constant value" refers to the time when the gain control coefficient K1' when the video signal is amplified only by the AGC circuit shown in FIG. 15 attains to K1'=max, as is apparent from FIG. 4.

The multiplication coefficient K2 is variable from 0.333 . . . to 1, and therefore this period is referred to as variable period.

When the brightness becomes still darker, multiplication coefficient K2 is maintained constant at K2=1, and multiplication coefficient K2 does not change any more even when the illuminance becomes darker.

That the multiplication coefficient K2 is K2=1 means that the signal level is not changed by multiplier 9 and only the addition process of three frames is performed by adders 6 and 8. Therefore, this period is referred to as addition period, as in the case of FIG. 2.

In the addition and averaging period, the signal level is kept constant as the gain control coefficient K1 changes, and noise component is reduced as the adding and averaging process among frames is performed by adders 6 and 8 and multiplier 9, similar to the operation of the video signal processing apparatus in accordance with the first embodiment.

The addition and averaging period refers to the period of illuminance until the illuminance attains to the signal level three times the amplifiable signal level when gain control coefficient K1' is max. Therefore, as compared with the operation of the video signal processing apparatus in accordance with the first embodiment, the addition and averaging period is shorter.

In the variable period, gain control coefficient K1 is constant at K1=const2 and amplification rate is not changed.

Therefore, as the illuminance becomes darker, the signal level decreases. However, the noise component is not amplified.

As multiplication coefficient K2 changes between 0.333 . . . and 1, noise component is reduced and the signal level is improved, as adding and averaging process among frames is performed.

The variable period refers to the period of illuminance from the brightness where the illuminance is three times the signal level of the amplifiable signal level with gain control coefficient K1' being max until the brightness when gain control coefficient K1' obtained when the video signal is amplified by AGC circuit only is K1'=max. Therefore, as compared with the operation of the video signal processing apparatus in accordance with the first embodiment, the variable period is longer.

In the addition period, addition of three frames is performed, and therefore signal level three times that before the addition process is obtained, and thus improvement is achieved.

As described above, in the video signal processing apparatus in accordance with the second embodiment, in a relatively bright illuminance range, adding and averaging process among frames is performed, whereby noise component is reduced.

In a relatively dark illuminance range, adding and averaging process among frames is performed, whereby noise component is reduced and the signal level is improved.

In a darker illuminance range, addition among frames is performed, whereby the signal level is improved.

In this manner, the video signal level is enhanced three times, and the noise component generated in that video signal can be reduced, whereby good image quality is ensured.

Third Embodiment

The video signal processing apparatus in accordance with the third embodiment will be described with reference to FIG. 5. Portions corresponding to the video signal processing apparatus in accordance with the first embodiment are denoted by the same reference characters and description thereof is not repeated.

Figure 5:
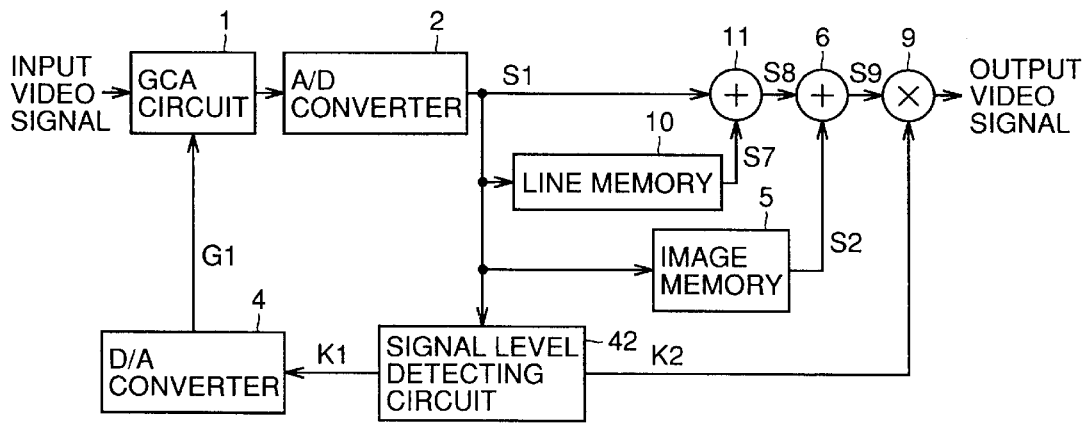
FIG. 5 shows a configuration of the video signal processing apparatus in accordance with a third embodiment of the present invention.

As can be seen from FIG. 5, the configuration of the video signal processing apparatus differs from that of the first embodiment in that it additionally includes a line memory 10 having a storage capacity of one line and operating as a one line delay circuit, and an adder 11 adding the video signal S7 delayed by one line with not delayed present video signal S1 output from A/D converter 2. Further, in place of signal level detecting circuit 3, a signal level detecting circuit 42 is used.

Line memory 10 has a storage capacity of one line and operates as a one line delay circuit. Video signal S7 delayed by one line by line memory 10 and not delayed present video signal S1 output from A/D converting circuit 2 are input to adder 11 and added together.

A video signal S8 which is a result of addition by adder 11 and video signal S2 delayed by one frame by image memory 5 are input to adder 6 and added together. A video signal S9 as a result of addition by adder 6 is input to multiplier 9.

Multiplication coefficient K2 output from signal level detecting circuit 42 is input to multiplier 9. Video signal S9 is multiplied by multiplication coefficient K2, and the result is provided as an output video signal.

Coefficients output from signal level detecting circuit 42 will be described with reference to FIG. 6. A coefficient curve of gain control coefficient K1' described with respect to the background art is also shown, as in FIG. 2.

Gain control coefficient K1 for controlling the gain of GCA circuit 1 changes in the similar manner as the coefficient curve of gain control coefficient K1' obtained when the video signal is amplified only by the AGC circuit shown in FIG. 15, to a certain brightness, when the brightness gradually changes from bright to dark.

Figure 6:
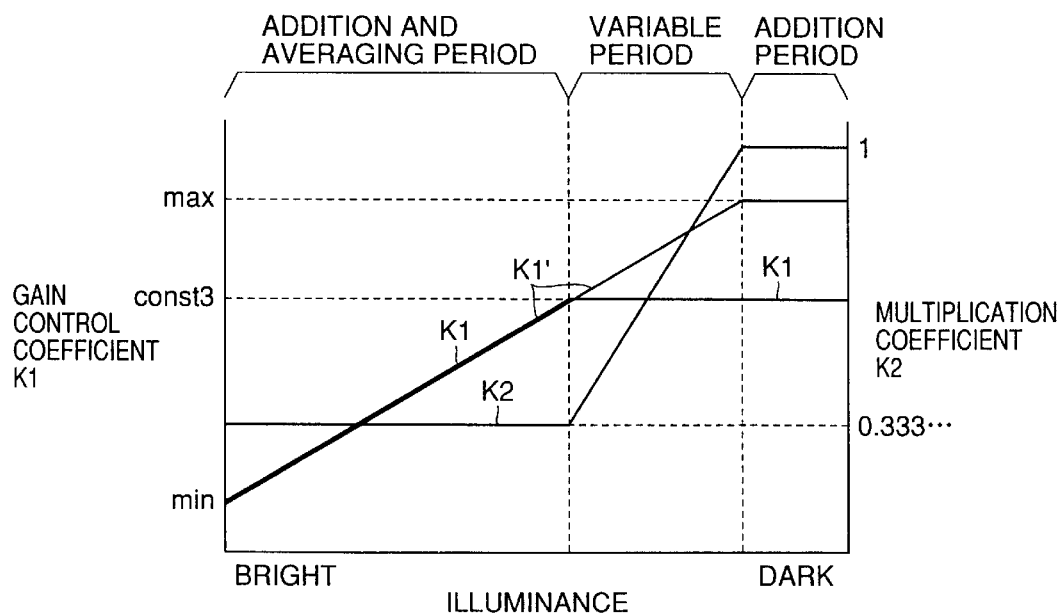
FIG. 6 represents changing characteristics of gain control coefficient K1 and multiplication coefficient K2 generated by the signal level detecting circuit 3 with respect to illuminance, in the video signal processing apparatus in accordance with the third embodiment of the present invention.

The certain brightness refers to that brightness at which the signal level attains three times the signal level amplifiable with gain control coefficient K1' being max, and the gain control coefficient K1 at that time is K1=const3, as can be seen from FIG. 6.

Even when the illuminance becomes darker from here, gain control coefficient K1=const3 is maintained, and therefore the signal level attains lower.

Next, the change in multiplication coefficient K2 which is input to multiplier 9 and is multiplexed by the video signal S9, when the illuminance gradually changes from bright to dark will be described.

To a certain brightness, multiplication coefficient is not changed but constant at K2=0.333 . . . . The multiplication coefficient K2=0.333 . . . means ⅓. Namely, this coefficient represents addition and averaging process performed by adders 11 and 6 and multiplier 9, and the period will be referred to as addition and averaging period as in the case of FIG. 2. The certain brightness refers to that brightness at which gain control coefficient K1=const3, as can be seen from FIG. 6.

As the illuminance becomes darker from here, multiplication coefficient K2 increases, until multiplication coefficient K2 attains 1 when a signal level detected by signal level detecting circuit 42 attains to a certain constant value.

The time when "the signal level detected by the signal level detecting circuit 42 attains to a certain constant value" refers to the time when the gain control coefficient K1' when the video signal is amplified only by the AGC circuit shown in FIG. 15 attains to K1'=max, as is apparent from FIG. 6.

The multiplication coefficient K2 is variable from 0.333 . . . to 1, and therefore this period is referred to as variable period, as in the case of FIG. 2.

When the brightness becomes still darker, multiplication coefficient K2 is maintained constant at K2=1, and multiplication coefficient K2 does not change any more even when the illuminance becomes darker.

That the multiplication coefficient K2 is K2=1 means that the signal level is not changed by multiplier 9 and only the addition process of lines and frames is performed by adders 11 and 6. Therefore, this period is referred to as addition period, as in the case of FIG. 2.

In the addition and averaging period, the signal level is kept constant as the gain control coefficient K1 changes similar to the operation of the video signal processing apparatus in accordance with the first embodiment, and noise component is reduced as the adding and averaging process among lines and frames is performed by adders 11 and 6 and multiplier 9.

The addition and averaging period refers to the period of illuminance until the illuminance attains to the signal level three times the amplifiable signal level when gain control coefficient K1' is max. Therefore, as compared with the operation of the video signal processing apparatus in accordance with the first embodiment, the addition and averaging period is shorter.

In the variable period, gain control coefficient K1 is constant at K1=const3, and amplification rate is not changed. Therefore, as the illuminance becomes darker, the signal level decreases. However, the noise component is not amplified.

As multiplication coefficient K2 changes between 0.333 . . . and 1, noise component is reduced and the signal level is improved, as adding and averaging process among frames is performed.

The variable period refers to the period of illuminance from the brightness where the illuminance is three times the signal level of the amplifiable signal level with gain control coefficient K1 being max until the brightness when gain control coefficient K1' obtained when the video signal is amplified by AGC circuit shown in FIG. 15 only is K1'=max. Therefore, as compared with the operation of the video signal processing apparatus in accordance with the first embodiment, the variable period is longer.

In the addition period, addition among lines and frames is performed, and therefore the signal level three times that before the addition can be obtained.

In the video signal processing apparatus in accordance with the third embodiment, in a relatively blight illuminance range, adding and averaging processes among lines and among frames are performed, whereby noise component is reduced.

In a relatively dark illuminance range, adding and averaging processes among lines and frames are performed, whereby noise component is reduced and the signal level is improved.

In a darker illuminance range, addition among lines and among frames is performed. Thus the signal level is improved.

In this manner, the video signal level is enhanced three times, and the noise component generated in that video signal can be reduced, whereby good image quality is ensured.

Fourth Embodiment

Figure 7:
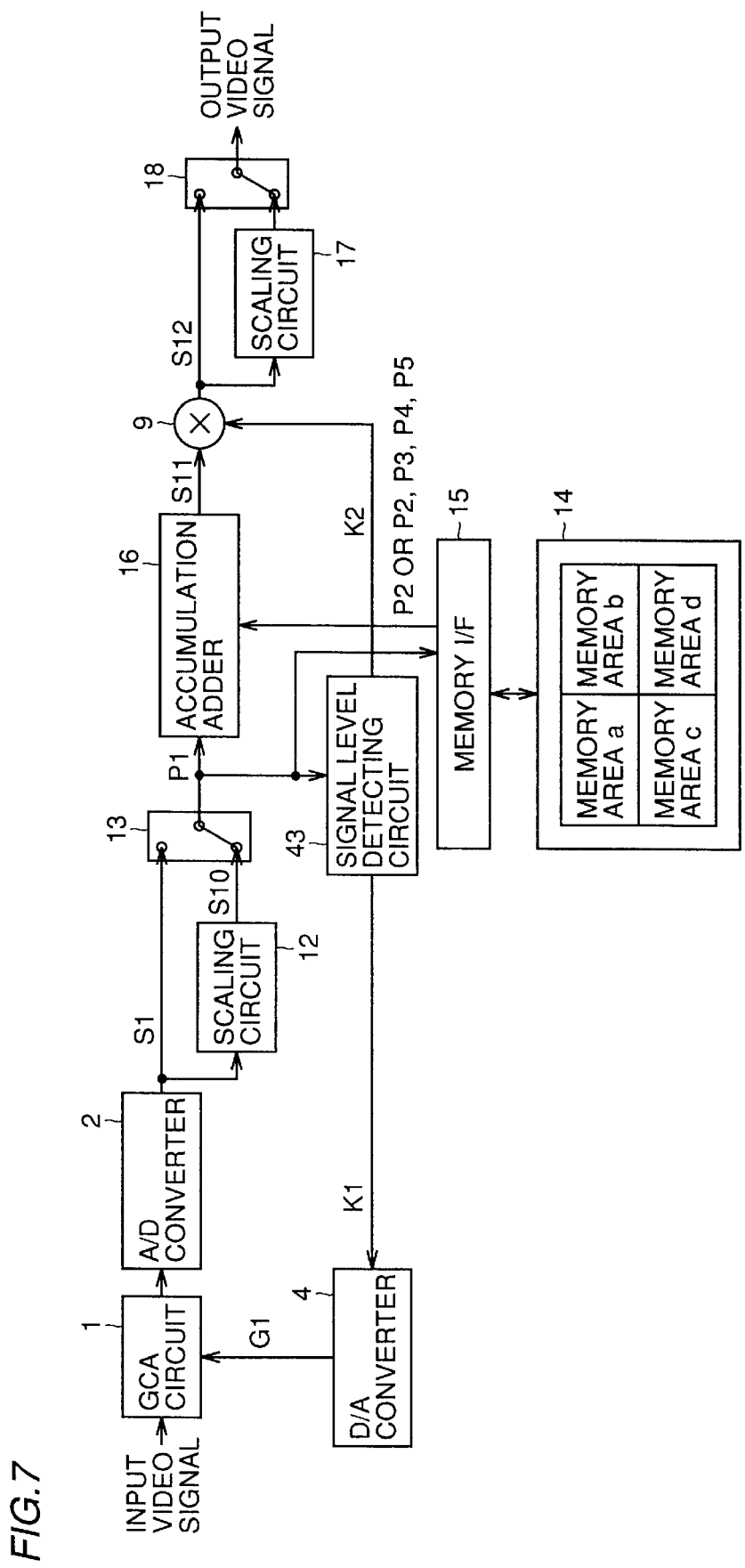
FIG. 7 shows a configuration of the video signal processing apparatus in accordance with a fourth embodiment of the present invention.

Referring to FIG. 7, the video signal processing apparatus in accordance with the fourth embodiment includes: a GCA circuit 1 amplifying an input video signal based on an analog control signal G1 output from D/A converter 4, which will be described later; an A/D converter 2 connected to GCA circuit 1 and converting the amplified video signal to a digital video signal S1; a signal level detecting circuit 43 connected to an output of a switching circuit 13, which will be described later, detecting present video signal level and generating gain control coefficient K1 and multiplication coefficient K2; a D/A converter 4 connected to signal level detecting circuit 43 and converting gain control coefficient K1 to analog control signal G1; a first scaling circuit 12 connected to A/D converter 2 and reducing image size of video signal S1 to 1/n; a first switching circuit 13 connected to A/D converter 2 and scaling circuit 12 for switching between normal video signal S1 and the video signal of which image size is reduced; an image memory 14 and a memory I/F (interface) 15, connected to switching circuit 13, having a storage capacity of one frame and operating as a one frame delay circuit or an n frame delay circuit for the video signal reduced to 1/n in pixel number ratio; an accumulation adder 16 connected to switching circuit 13 and adding the one frame delayed video signal or video signals of a plurality of frames delayed by n frames at most to the not delayed present video signal; a multiplier 9 connected to accumulation adder 16 and multiplying the video signal added by accumulation adder 16 by multiplication coefficient K2; a second scaling circuit 17 connected to multiplier 9 and enlarging image size of the multiplied video signal; and a second switching circuit 18 connected to multiplier 9 and scaling circuit 17 for switching between the normal video signal and the video signal of which image size is enlarged.

Image memory 14 has a storage capacity of one frame and operates as one frame delay circuit or an n frame delay circuit for a video signal reduced to 1/n in pixel number ratio.

Memory I/F 15 performs memory control to generate delayed video signals.

When switches of switching circuits 13 and 18 are switched to the upper side in the figure, respectively, the video signal does not pass through the first and second scaling circuits 12 and 17. Therefore, the video signal processing apparatus operates in the similar manner as the video signal processing apparatus in accordance with the first embodiment.

At that time, image memory 14 operates as a one frame delay circuit, and memory I/F 15 performs memory control to generate one frame delayed video signal.

When the switches of switching circuits 13 and 18 are switched to the lower side respectively in the figure, the video signal passes through the first and second scaling circuits 12 and 17.

At this time, the first scaling circuit 12 operates to reduce the video signal to 1/n in terms of pixels size, and generates a video signal S10 reduced to 1/n.

At this time, image memory 14 operates as an n frame delay circuit for video signal S10 which has been reduced to 1/n, and memory I/F 15 performs time divisional memory control, so that delayed video signals from 1 to n frames are generated.

In the following description, it is assumed that n=4 in the present embodiment.

Where n=4, the first scaling circuit 12 operates to reduce the video signal to the image size of ¼ in terms of pixel number ratio. This means that the normal video signal image size of 352 pixels in horizontal direction and 288 pixels in the vertical direction is reduced to the size of 176 pixels in the horizontal direction and 144 pixels in the vertical direction.

When n=4, the second scaling circuit 17 operates to enlarge the video signal to four times the image size in terms of the pixel number ratio.

This means that the video signal of the image size of 176 pixels in the horizontal direction and 144 pixels in the vertical direction before scaling, for example, is enlarged to the image size of 352 pixels in the horizontal direction and 288 pixels in the vertical direction.

Where n=4, image memory 14 has four memory areas, that is, memory areas a, b, c and d, and is subjected to memory control.

Here, image memory 14 stores delayed video signals one frame to four faces preceding the present signal and reduced to ¼. Memory I/F 15 reads pixel information P2, P3, P4 and P5 of respective delayed video signals, which information corresponds to the pixel information of the same pixel position as pixel information P1 of the not delayed present video signal S1 provided from switching circuit 13.

Further, memory I/F 15 writes pixel information P1 of the not delayed present video signal S1 output from switching circuit 13 in the order of memory areas a, b, c and d. When pixel information P1 is written to memory area d, writing is again performed in the order of memory areas a, b, c and d.

Therefore, in image memory 14, there is always the delayed video signals preceding by one to four frames, respectively.

The pixel information P1 of the present video signal output from switching circuit 13 and pixel information P2, P3, P4 and P5 of delayed video signals read from image memory 14 through memory I/F 15 are input to accumulation adder 16.

Figure 8:
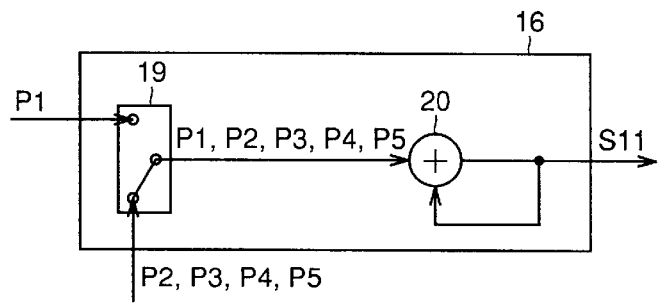
FIG. 8 represents a detailed configuration of an accumulation adder 16 in the video signal processing apparatus in accordance with the fourth embodiment of the present invention.

Referring to FIG. 8, accumulation adder 16 includes a switching circuit 19 connected to switching circuit 13 and memory I/F15 and an adder 20 connected to switching circuit 19.

The pixel information P1 of the present video signal and pixel information P2, P3, P4 and P5 of respective delayed video signals are input to switching circuit 19, and when pixel information P1 of the present video signal is input, the switch shown in switching circuit 19 is switched to the upper side in the figure. When pixel information P2, P3, P4 and P5 of respective delayed video signals is input to switching circuit 19, the switch shown in switching circuit 19 is switched to the lower side in the figure.

Accordingly, the switching circuit 19 outputs the pixel information P1 of the present video signal and pixel information P2, P3, P4 and P5 of respective delayed video signals continuously, and pixel information P1 to P5 is input to adder 20.

Adder 20 is configured such that the result of addition is fed back to an input of adder 20, and it operates to add pixel information P1 of the present video signal with all the pixel information P2, P3, P4 and P5 of respective delayed video signals.

Again referring to FIG. 7, a video signal S11 output from accumulation adder 16 is input to multiplier 9. Multiplication coefficient K2 output from signal level detecting circuit 43 is input to multiplier 9, video signal S11 is multiplied by multiplication coefficient K2, and the resulting video signal S12 is output.

The video signal S12 is input to the second scaling circuit 17. At this time, the second scaling circuit 17 operates to enlarge video signal S12 to n times in terms of pixel size, and generates n times enlarged video signal.

The n times enlarged video signal generated by the second scaling circuit 17 is passed through switching circuit 18 and provided as an output video signal.

Coefficients output from signal level detecting circuit 43 will be described with reference to FIG. 9. A coefficient curve of gain control coefficient K1 described with respect to the background art is also shown, as in FIG. 2.

Gain control coefficient K1 for controlling the gain of GCA circuit 1 changes in the similar manner as the coefficient curve of gain control coefficient K1' obtained when the video signal is amplified only by the AGC circuit shown in FIG. 15, to a certain brightness, when the brightness gradually changes from bright to dark.

Figure 9:
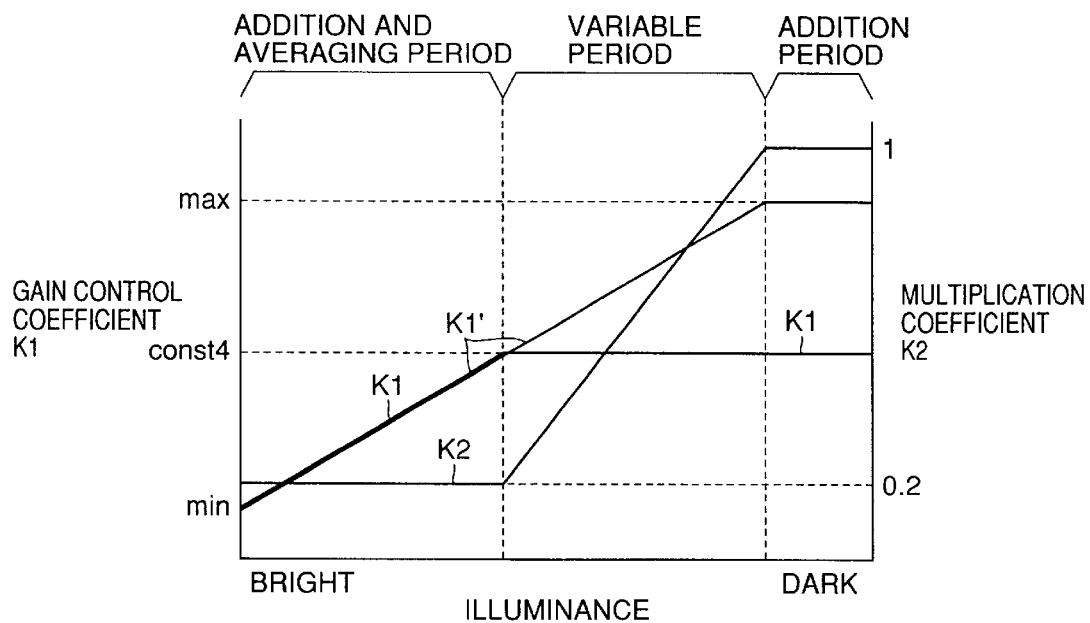
FIG. 9 represents changing characteristics of gain control coefficient K1 and multiplication coefficient K2 generated by the signal level detecting circuit 3 with respect to illuminance, in the video signal processing apparatus in accordance with the fourth embodiment of the present invention.

The certain brightness refers to that brightness at which the signal level attains five times the signal level amplifiable with gain control coefficient K1' being max, and the gain control coefficient K1 at that time is K1=const4, as can be seen from FIG. 9.

Even when the illuminance becomes darker from here, gain control coefficient K1=const4 is maintained, and therefore the signal level attains lower.

Next, the change in multiplication coefficient K2 which is multiplexed by the video signal S11 input to multiplier 9, when the illuminance gradually changes from bright to dark will be described.

To a certain brightness, multiplication coefficient is not changed but constant at K2=0.2. The multiplication coefficient K2=0.2 means ⅕. Namely, this coefficient represents addition and averaging process performed by accumulation adder 16 and multiplier 9, and the period will be referred to as addition and averaging period as in the case of FIG. 2.

The certain brightness refers to that brightness at which gain control coefficient K1=const4, as can be seen from FIG. 9.

As the illuminance becomes darker from here, multiplication coefficient K2 increases, until multiplication coefficient K2 attains 1 when a signal level detected by signal level detecting circuit 43 attains to a certain constant value.

The time when "the signal level detected by the signal level detecting circuit 43 attains to a certain constant value" refers to the time when the gain control coefficient K1' when the video signal is amplified only by the AGC circuit shown in FIG. 15 attains to K1'=max, as is apparent from FIG. 9.

The multiplication coefficient K2 is variable from 0.2 to 1, and therefore this period is referred to as variable period as in the case of FIG. 2.

When the brightness becomes still darker, multiplication coefficient K2 is maintained constant at K2=1, and multiplication coefficient K2 does not change any more even when the illuminance becomes darker.

That the multiplication coefficient K2 is K2=1 means that the signal level is not changed by multiplier 9 and only the addition process of five frames is performed by accumulation adder 16. Therefore, this period is referred to as addition period as in the case of FIG. 2.

In the addition and averaging period, the signal level is kept constant as the gain control coefficient K1 changes similar to the operation of the video signal processing apparatus in accordance with the first embodiment, and noise component is reduced as the adding and averaging process among lines and frames is performed by adder 16 and multiplier 9.

The addition and averaging period refers to the period of illuminance until the illuminance attains to the signal level five times the amplifiable signal level when gain control coefficient K1 is max. Therefore, as compared with the operation of the video signal processing apparatus in accordance with the first embodiment, the addition and averaging period is still shorter.

In the variable period, gain control coefficient K1 is constant at K1=const4 and amplification rate is not changed. Therefore, as the illuminance becomes darker, the signal level decreases. However, the noise component is not amplified.

As multiplication coefficient K2 changes between 0.2 and 1, noise component is reduced and the signal level is improved, as adding and averaging process among frames is performed.

The variable period refers to the period of illuminance from the brightness where the illuminance is five times the signal level of the amplifiable signal level with gain control coefficient K1' being max until the brightness when gain control coefficient K1' obtained when the video signal is amplified by AGC circuit only is K1'=max. Therefore, as compared with the operation of the video signal processing apparatus in accordance with the first embodiment, the variable period is still longer.

In the addition period, addition of five frames is performed, so that the signal level can be improved to be five times higher than before addition.

The second scaling circuit 17 and switching circuit 18 described above are necessary circuits when the image size of the output video signal must be the same image size as the input video signal. Therefore, when the video signal of the image size obtained after scaling by first scaling circuit 12 is desired, second scaling circuit 17 and switching circuit 18 are unnecessary from the following reason.

More specifically, when the image size of the normal video signal is 352 pixels in the horizontal direction and 288 pixels in the vertical direction, that is, when it is in compliance with CIF (common intermediate format) defined by recommendation H.261 or H.263 (standard document related to video encoding for narrow band communication channel) issued by International Telecommunication Union-Standardization Sector (ITU-T), the image size of the video signal reduced to ¼ is 176 pixels in the horizontal direction and 144 pixels in the vertical direction. This corresponds to QCIF (Quarter Common Intermediate Format). Therefore, when the video signal processing apparatus in accordance with the present invention is used for an image communication terminal in accordance with H.261 or H.263, the image size scaled to ¼, that is, image size of QCIF can be used as it is.

In the video signal processing apparatus in accordance with the fourth embodiment, the video signal reduce to 1/n in terms of pixel number ratio is generated, and therefore in a relatively bright illuminance range, adding and averaging process among (n+1) frames is performed, whereby noise component is reduced.

In a relatively dark illuminance range, adding and averaging process among (n+1) frames is performed, whereby noise component is reduced while the signal level is improved.

In a darker illuminance range, addition among (n+1) frames is performed, whereby the signal level is improved.

Therefore, even without the necessity of increasing image memory, the video signal level picked up at low illuminance can be improved by (n+1) times, and the noise component of the video signal can further be reduced, so that good image quality is ensured.

Fifth Embodiment

Figure 10:
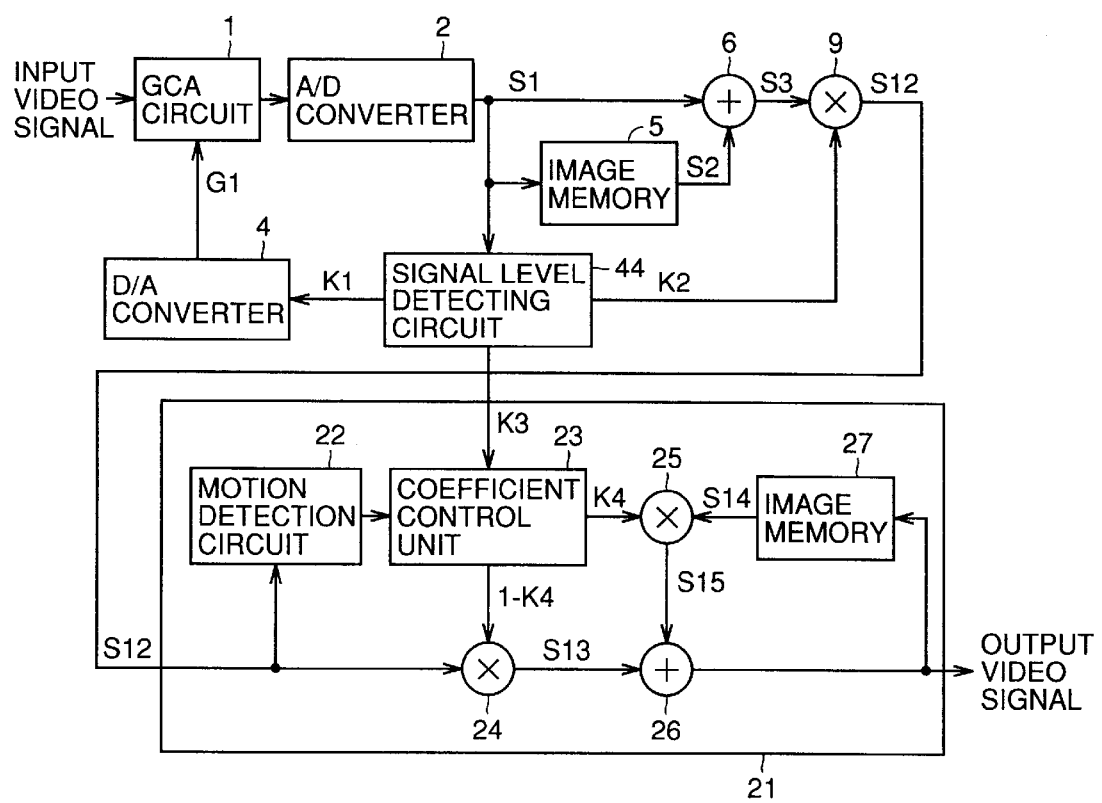
FIG. 10 shows a configuration of the video signal processing apparatus in accordance with a fifth embodiment of the present invention.

Referring to FIG. 10, the video signal processing apparatus in accordance with the fifth embodiment will be described. Portions corresponding to the video signal processing apparatus in accordance with the first embodiment are denoted by the same reference characters and description thereof is not repeated.

As can be seen from FIG. 10, the configuration of the video signal processing apparatus differs from that of the first embodiment in that it additionally includes a frame cyclic type noise reduction circuit 21. Further, in place of signal level detecting circuit 3, a signal level detecting circuit 44 is used.

The frame cyclic type noise reduction circuit 21 includes: a motion detection circuit 22 connected to multiplier 9 and detecting a motion pixel from a video signal S12 which has been improved with respect to low illuminance; a coefficient control unit 23 connected to signal level detecting circuit 44 and motion detection circuit 22 and controlling a filter parameter coefficient; a multiplier 24 connected to multiplier 9 and coefficient control unit 23; a multiplier 25 connected to coefficient control unit 23 and an image memory 27, which will be described later; an adder 26 connected to multipliers 24 and 25; and an image memory 27 connected to adder 26, having a storage capacity of one frame and operating as a one frame delay circuit.

The video signal S12 which has been improved with respect to low illuminance output from video signal processing apparatus in accordance with the first embodiment is input to motion detection circuit 22 and multiplier 24. Motion detection circuit 22 calculates an amount of change in motion of each pixel from the video signal S12 which has been improved for low illuminance.

The calculated motion information is input to coefficient control unit 23. A filter parameter coefficient K3 output from signal level detecting circuit 44 in the video signal processing apparatus is also input to coefficient control unit 23.

Coefficient control unit 23 changes the filter parameter coefficient K3 in the range of 0 to 1 in accordance with the motion information provided from motion detection circuit 22, based on the filter parameter coefficient K3 obtained from the signal level detecting circuit 44 in the video signal processing apparatus, to generate a filter parameter coefficient K4.

More specifically, when it is determined that there is no motion information detected by motion detection circuit 22, filter parameter coefficient K3 is directly used as filter parameter coefficient K4. When there is motion information detected by motion detection circuit 22, a coefficient obtained by reducing filter parameter coefficient K3 is used as the filter parameter coefficient K4.

Based on the filter parameter coefficient K4 generated in coefficient control unit 23, (1−K4) is applied to applied to multiplier 24, and K4 is applied to multiplier 25.

The video signal S12 which has been improved with respect to low illuminance is first multiplied by (1−K4) in multiplier 24, whereby video signal S13 is generated.

Here, image memory 27 has a storage capacity of one frame and operates as a one frame delay circuit. Image memory 27 stores the output video signal S14 generated one frame before, and the one frame delayed output video signal S14 is supplied to multiplier 25.

The output video signal S14 delayed by one frame is multiplied by K4 in multiplier 25, and a video signal S15 is generated.

Video signals S13 and S15 generated by multipliers 24 and 25 are input to adder 26 and added together, thus an output video signal is generated.

The generated output video signal is also input to image memory 27, and it is used for generating the output video signal delayed by one frame, mentioned above.

In the frame cyclic type noise reduction circuit 21, the effect of reducing noise component is higher if the filter parameter coefficient K4 is larger (closer to 1).

As the frame cyclic type noise reduction circuit 21 operates in the above described manner, a time filter having frequency characteristic in the time axis direction degraded is provided, whereby shot noise without frame correlation can be reduced.

Based on the motion information detected by motion detection circuit 22, filter parameter is changed by frame cyclic noise reduction circuit 21, so as to reduce afterimage or blurring caused by an application of a time filter to a motion pixel without frame correlation as frequency characteristic from the time axis degrades. When motion information is detected by motion detection circuit 22, a smaller filter parameter coefficient is adopted to reduce afterimage or blurring.

Figure 11:
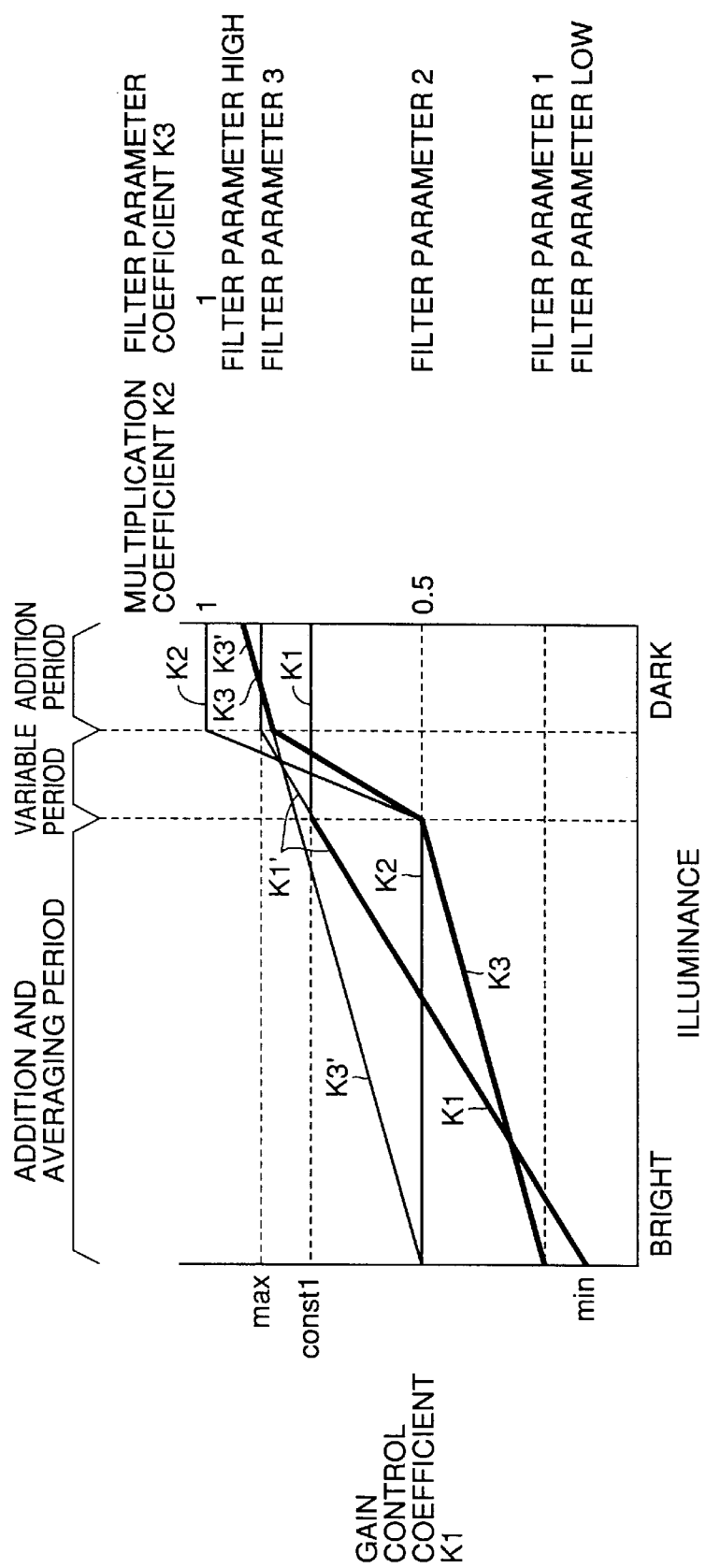
FIG. 11 represents changing characterstics of gain control coefficient K1, multiplication coefficient K2 and filter parameter coefficient K3 generated by the signal level detecting circuit 3 with respect to illuminance, in the video signal processing apparatus in accordance with the fifth embodiment of the present invention.

Referring to FIG. 11, coefficients output from signal level detecting circuit 44 will be described.

Similar to FIG. 2, the coefficient curve of gain control coefficient K1' described with reference to the background art is also shown.

Gain control coefficient K1 for controlling the gain of GCA circuit 1 changes in the similar manner as the coefficient curve of gain control coefficient K1' obtained when the video signal is amplified only by the AGC circuit shown in FIG. 15, to a certain brightness, when the brightness gradually changes from bright to dark.

The certain brightness refers to that brightness at which the signal level attains twice the signal level amplifiable with gain control coefficient K1', being max, and the gain control coefficient K1 at that time is K1=const1, as can be seen from FIG. 11.

Even when the illuminance becomes darker from here, gain control coefficient K1=const1 is maintained, and therefore the signal level attains lower.

The multiplication coefficient K2 which is input to multiplier 9 and multiplied by the video signal S3 which is the result of addition by adder 6 changes in the similar manner as multiplication coefficient K2 described with reference to the video signal processing apparatus in accordance with the first embodiment. Therefore, description thereof is not repeated.

Next, change in filter parameter control coefficient K3 input to coefficient control unit 23 of frame cyclic noise reduction circuit 21 when the illuminance changes from bright to dark gradually will be described.

To a certain brightness, filter parameter control coefficient K3 increases at a constant rate of increase until filter parameter attains from 1 to 2.

The certain brightness refers to the brightness where gain control coefficient K1 attains K1=const1 as shown in FIG. 11, which corresponds to the addition and averaging period described with reference to the video signal processing apparatus in accordance with the first embodiment.

When the illuminance attains darker, filter parameter control coefficient K3 increases from filter parameter 2 to filter parameter 3 when the signal level detected by signal level detecting circuit 44 attains to a prescribed value, at a higher rate of increase than in the addition and averaging period.

"When the signal level detected by the signal level detecting circuit 44 attains to a prescribed value" means the time when the gain control coefficient K1' (gain control coefficient obtained when the video signal is amplified by AGC circuit only) described with reference to the video signal processing apparatus in accordance with the first embodiment attains to K1'=max, as is apparent from FIG. 11. The variable period of FIG. 11 is the same as the variable period described with reference to the video signal processing apparatus in accordance with the first embodiment.

When the illuminance attains still darker, filter parameter control coefficient K3 increases from filter parameter 3 to filter parameter HIGH, at the same rate of increase as in the addition and averaging period.

This period of change is the same as the addition period described with reference to the video signal processing apparatus in accordance with the first embodiment.

The reason why the filter parameter control coefficient K3 has such a change characteristic will be described in the following.

The filter parameter control coefficient K3' shown in FIG. 11 is not intended to improve signal level by frame addition process such as implemented in the video signal processing apparatus in accordance with the first embodiment, that is, the noise characteristic when the effect of reducing noise component by addition and averaging process in the addition and averaging period and the variable period for improving low illuminance. More specifically, the filter parameter control coefficient K3' changes in accordance with the noise characteristic when the signal level is improved by the AGC circuit shown in FIG. 15 only, as described with reference to the background art. The filter parameter control coefficient with the effect of improvement in the signal level attained by frame addition process as in the video signal processing apparatus in accordance with the first embodiment subtracted, is applied to the filter parameter control coefficient K3. This is the reason why the filter parameter control coefficient K3 has such a characteristic as it changes, as described above.

In the addition and averaging period, similar to the operation of the video signal processing apparatus in accordance with the first embodiment, the signal level is kept constant as the gain control coefficient K1 changes, and the noise component is reduced as the addition and averaging process among frames is performed by the adder and the multiplier.

Further, as the noise component is reduced by the addition and averaging process, the noise reduction circuit 21 operates to weaken the filter parameter of noise reduction circuit 21.

In the variable period, gain control coefficient K1 is constant at K1=const1, and the rate of increase does not change. Therefore, as the illuminance attains darker, the signal level becomes smaller, whereas the noise component is not amplified.

The multiplication coefficient K2 changes between 0.5 and 1. Therefore, by the addition and averaging process among frames, noise component is reduced while the signal level is improved.

As the noise component is reduced by the addition and averaging process in the variable period, noise reduction circuit 21 operates to weaken the filter parameter of noise reduction circuit 21.

In the addition period, addition among frames is performed, so that the signal level is improved to twice higher. Noise reduction circuit 21 operates such that the filter parameter of the noise reduction circuit 21 attains filter parameter HIGH. Thus the filter parameter of the noise reduction circuit 21 is automatically controlled.

In the video signal processing apparatus in accordance with the fifth embodiment, in a relatively bright illuminance range, the noise component is reduced by the addition and averaging process and the filter parameter of the noise reduction circuit 21 is weakened by that amount. Therefore, afterimage or blurring, generated when the time filter is applied even to motion pixels without any frame correlation, can be reduced.

Further, in a relatively dark illuminance range, as the detected signal level lowers, the filter parameter of the noise reduction circuit 21 can be increased gradually to compensate for the decrease in noise reduction effect attained by the addition and averaging process. Therefore, decrease in noise reduction effect attained by the addition and averaging process can be compensated for by the noise reduction circuit 21.

In a darker illuminance range, the filter parameter of the noise reduction circuit 21 is maximized, so that the noise component reduction effect which cannot be attained by the addition process can be assisted by the noise reduction circuit 21.

Accordingly, the level of a video signal picked up at low illuminance can be improved to be twice higher, afterimage or blurring can be suppressed, and noise component generated in the video signal can be reduced even at the low illuminance, whereby good image quality is ensured.

Sixth Embodiment

The video signal processing apparatus in accordance with the sixth embodiment will be described with reference to FIG. 12.

Portions corresponding to the video signal processing apparatus in accordance with the fifth embodiment are denoted by the same reference characters and description thereof is not repeated.

Figure 12:
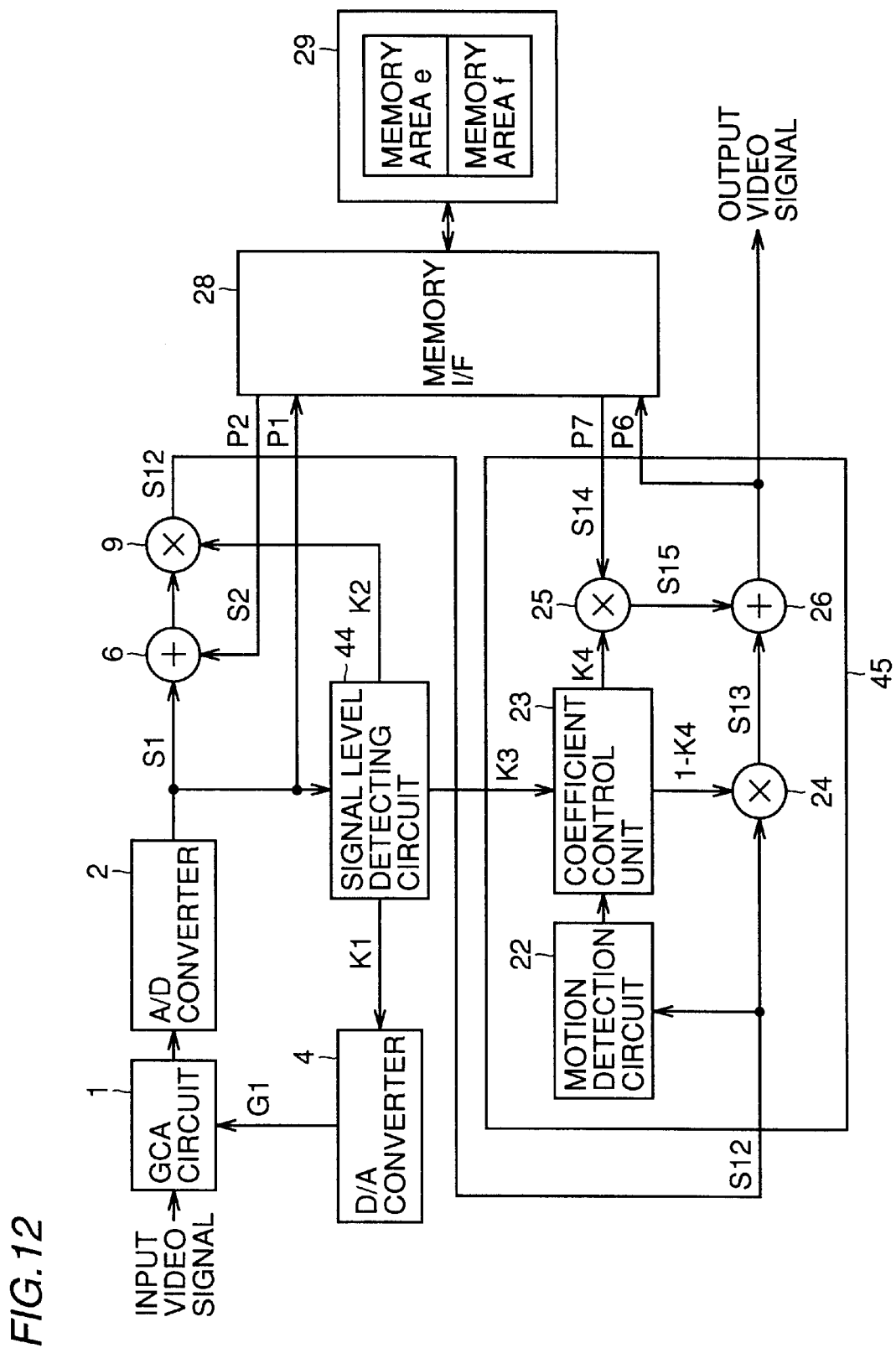
FIG. 12 shows a configuration of the video signal processing apparatus in accordance with a sixth embodiment of the present invention.

As can be seen from FIG. 12, the configuration of the video signal processing apparatus differs from that of the fifth embodiment in that in place of image memory 5 for frame addition process and image memory 27 contained in noise reduction circuit 21 of the video signal processing apparatus in accordance with the fifth embodiment, an image memory 29 having a storage capacity of two frames and allowing parallel operation of one frame delay circuit, and a memory I/F28 are used. Therefore, in place of noise reduction circuit 21, a noise reduction circuit 45 is used.

Memory I/F28 and image memory 29 operate as a delay circuit for generating a video signal delayed by one frame necessary for frame addition process of the video signal processing apparatus, or as a delay circuit for generating a video signal delayed by one frame used by noise reduction circuit 45.

Memory I/F28 time divisionally performs memory control for generating video signal S2 delayed by one frame necessary for the frame addition process by the video signal processing apparatus and memory control for generating video signal S14 delayed by one frame used for noise reduction.

Image memory 29 has two memory areas, that is, memory areas e and f, which are subjected to memory control, respectively.

When memory I/F28 and image memory 29 operate as a delay circuit for generating video signal S2 delayed by one frame necessary for the frame addition process by the video signal processing apparatus, memory I/F28 reads, from the video signal delayed by one frame stored in image memory 29, pixel information P2 at the same pixel position as pixel information P1 of the not delayed present video signal S1 output from A/D converter 2.

Further, memory I/F28 writes pixel information P1 of the not delayed present video signal S1 output from A/D converter 2 of the video signal processing apparatus to memory area e.

Therefore, in image memory 29, there is always stored a video signal delayed by one frame.

When memory I/F28 and image memory 29 operate as a delay circuit for generating video signal S14 delayed by one frame used by noise reduction circuit 45, memory I/F28 reads, from the video signal delayed by one frame from the output video signal stored in image memory 29, pixel information P7 at the same pixel position as pixel information P6 of the output video signal output from adder 26.

Further, memory I/F28 writes the pixel information P6 of the output video signal output from adder 26 of noise reduction circuit 45 to memory area f.

Accordingly, in image memory 29, there is always stored an output video signal delayed by one frame.

In the video signal processing apparatus in accordance with the sixth embodiment, the image memory necessary for generating the video signal delayed by one frame used for frame addition and noise reduction, respectively, can be reduced to one memory device. Therefore, the number of parts and circuit scale can be reduced.

Seventh Embodiment

The video signal processing apparatus in accordance with the seventh embodiment will be described with reference to FIG. 13.

Figure 13:
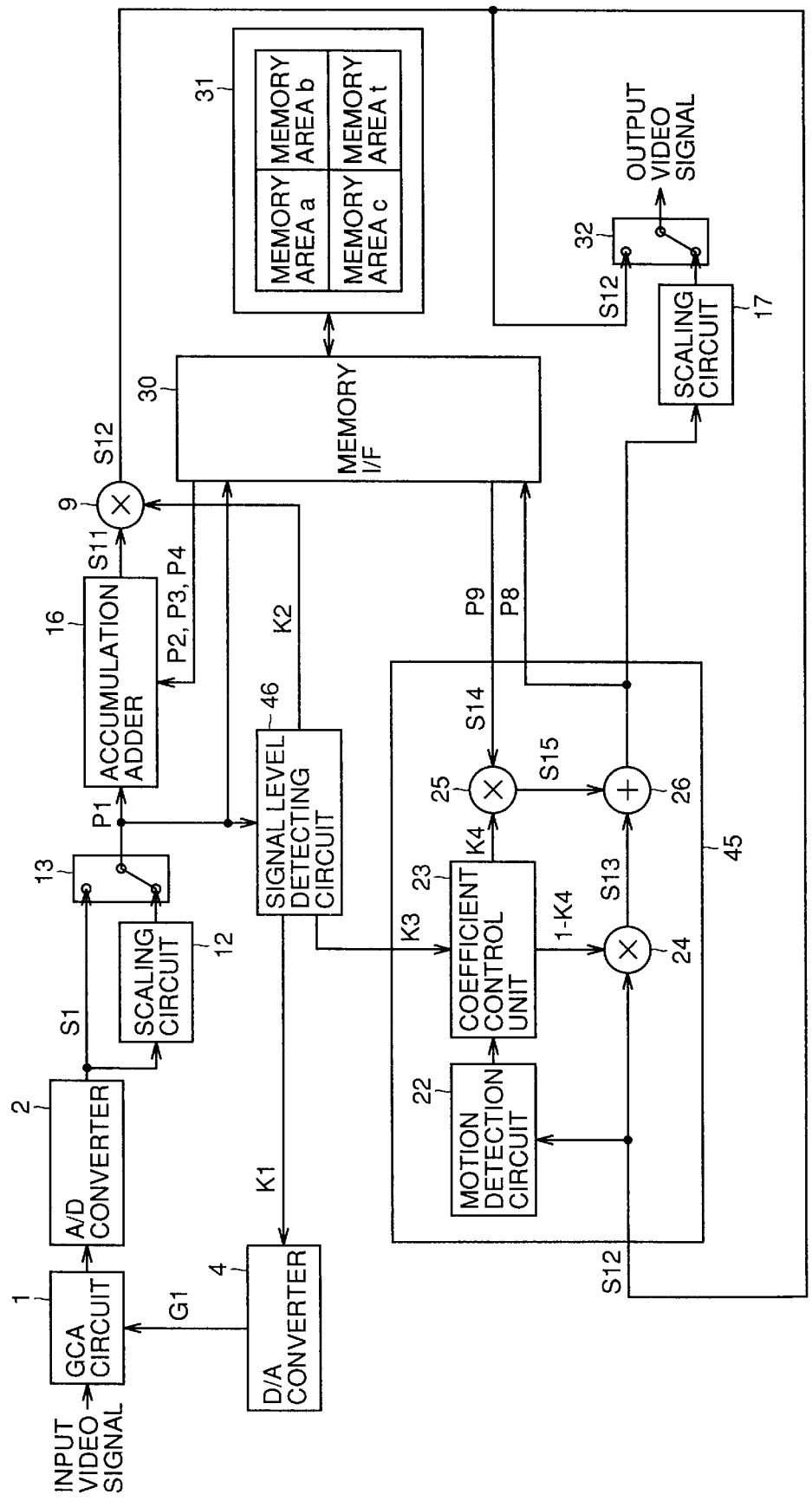
FIG. 13 shows a configuration of the video signal processing apparatus in accordance with a seventh embodiment of the present invention.

Referring to FIG. 13, the video signal processing apparatus in accordance with the seventh embodiment includes: a GCA circuit 1 connected to a D/A converter 4 and amplifying an input video signal in accordance with an analog control signal G1 output from D/A converter 4; an A/D converter 2 connected to GCA circuit 1 and converting the amplified video signal to a digital video signal; a signal level detecting circuit 46 connected to an output of a switching circuit 13, which will be described later, detecting present video signal level and generating gain control coefficient K1, multiplication coefficient K2 and filter parameter coefficient K3; a D/A converter 4 connected to signal level detecting circuit 46 and converting gain control coefficient K1 to an analog control signal; a first scaling circuit 12 reducing the image size of the video signal to 1/n; a first switching circuit 13 connected to an output of A/D converter 2 and switching between the normal video signal and the video signal with the image size reduced; a memory I/F30 and image memory 31 connected to an output of switching circuit 13, having a storage capacity of one frame and operating as a one frame delay circuit or a delay circuit for delaying by (n−1) frames the video signal reduced to 1/n in pixel number ratio; an accumulation adder 16 connected to switching circuit 13 and memory I/F30 and adding the one frame delayed video signal or the video signal of a plurality of frames delayed by (n−1) frames at most with the not delayed present video signal; a multiplier 9 connected to accumulation adder 16 and signal level detecting circuit 46 and multiplying the added video signal by the multiplication coefficient K2; a frame cyclic noise reduction circuit 45 connected to signal level detecting circuit 46; a second scaling circuit 17 connected to frame cyclic noise reduction circuit 45 for enlarging the image size of the video signal; and a third switching circuit 32 connected to multiplier 9 and scaling circuit 17 for switching among normal video signal, the video signal with the image size enlarged and the video signal without noise reduction.

The frame cyclic noise reduction circuit 45 has the same configuration as noise reduction circuit 45 used in the video signal processing apparatus in accordance with the sixth embodiment, and therefore, description is not repeated.

Image memory 31 has a storage capacity of one frame and operates as one frame delay circuit or an n frame delay circuit for a video signal reduced to 1/n in pixel number ratio. Memory I/F30 performs memory control to generate delayed video signals.

When the switches shown in switching circuits 13 and 32, respectively, are switched to the upper side in the figure, the video signal does not pass through the first scaling circuit 12, the frame cyclic noise reduction circuit 45 and the second scaling circuit 17, and therefore the video signal processing apparatus operates in the similar manner as the video signal processing apparatus in accordance with the first embodiment.

At that time, image memory 31 operates as a one frame delay circuit, and memory I/F30 performs memory control to generate one frame delayed video signal.

When the switches of switching circuits 13 and 32 are switched to the lower side, respectively, in the figure, the video signal passes through w the first scaling circuit 12, frame cyclic noise reduction circuit 45 and the second scaling circuit 17.

At this time, the first scaling circuit 12 operates to reduce the video signal to 1/n in terms of pixels size, and generates a video signal S10 reduced to 1/n.

At this time, image memory 31 operates as an (n−1) frame delay circuit for video signal S10 which has been reduced to 1/n, and memory I/F30 performs time divisional memory control, so that delayed video signals from 1 to (n−1) frames are generated.

In the following description, it is assumed that n=4 in the present embodiment.

Where n=4, the first scaling circuit 12 operates to reduce the video signal to the image size of ¼ in terms of pixel number ratio, as in the video signal processing apparatus in accordance with the fourth embodiment.

This means that the normal video signal image size of 352 pixels in horizontal direction and 288 pixels in the vertical direction is reduced to the size of 176 pixels in the horizontal direction and 144 pixels in the vertical direction.

When n=4, the second scaling circuit 17 operates to enlarge the video signal to four times the image size in terms of the pixel number ratio.

This means that the video signal of the image size of 176 pixels in the horizontal direction and 144 pixels in the vertical direction before scaling, for example, is enlarged to the image size of 352 pixels in the horizontal direction and 288 pixels in the vertical direction.

Where n=4, image memory 31 has three memory areas, that is, memory areas a, b, and c, and is subjected to memory control.

Here, image memory 31 stores delayed video signals one frame to three frames preceding the present signal and reduced to ¼. Memory I/F30 reads pixel information P2, P3 and P4 of respective delayed video signals, which information corresponds to the pixel information of the same pixel position as pixel information P1 of the not delayed present video signal S1 provided from switching circuit 13.

Further, memory I/F30 writes pixel information P1 of the not delayed present video signal S1 output from switching circuit 13 in the order of memory areas a, b and c. When pixel information P1 is written to memory area c, writing is again performed in the order of memory areas a, b and c.

Therefore, in image memory 31, there is always the delayed video signals preceding by one to three frames, respectively.

The pixel information P1 of the present video signal output from switching circuit 13 and pixel information P2, P3 and P4 of delayed video signals read from image memory 31 through memory I/F30 are input to accumulation adder 16.

Accumulation adder 16 operates to add pixel information P1 of the present video signal and all pixel information P2, P3 and P4 of respective delayed video signals.

The video signal S11 output from accumulation adder 16 is input to multiplier 9. Multiplication coefficient K2 output from signal level detecting circuit 46 is further input to multiplier 9. Video signal S11 is multiplied by multiplication coefficient K2, and the result is output as video signal S12 improved for low illuminance.

The video signal S12 which has been improved for low illuminance output from video signal processing circuit in accordance with the seventh embodiment is input to motion detection circuit 22 and multiplier 24 of frame cyclic noise reduction circuit 45, and switching circuit 32.

Motion detection circuit 22 calculates the amount of change in motion of each pixel from video signal S12 which has been improved for low illuminance. The calculated motion information is supplied to coefficient control unit 23.

To coefficient control unit 23, filter parameter coefficient K3 output from signal level detecting circuit 46 in the video signal processing apparatus is also input.

Coefficient control unit 23 changes the filter parameter coefficient K3 within the range of 0 to 1 in accordance with the motion information obtained from motion detection circuit 22, based on the filter parameter coefficient K3 obtained from signal level detecting circuit 46 within the video signal processing apparatus, to generate a filter parameter coefficient K4.

More specifically, when it is determined that no motion information is detected by motion detection circuit 22, coefficient control unit 23 provides filter parameter coefficient K3 directly as filter coefficient parameter K4, and when it is determined that motion information is detected by motion detection circuit 22, a coefficient obtained by making smaller the filter parameter coefficient K3 is provided as filter parameter coefficient K4.

Based on the filter parameter coefficient K4 generated in coefficient control unit 23, (1−K4) is supplied to multiplier 24, and K4 is supplied to multiplier 25, respectively.

The video signal S12 improve for low illuminance is first multiplied by (1−K4) in multiplier 24, so that video signal S13 is generated.

Here, in a memory area t of image memory 31, an output video signal generated one frame before is stored. Memory I/F30 reads pixel information P9 which is at the same pixel position as the pixel information of video signal S12 improved for low illuminance output from the video signal processing apparatus, from memory area t.

Accordingly, memory I/F30 outputs pixel information P9 of the output video signal generated one frame before and supplies the information to multiplier 25.

The pixel information P9 of output video signal S14 delayed by one frame is multiplied by K4 in multiplier 25, and a video signal S15 is generated.

Video signals S13 and S15 generated by multipliers 24 and 25, respectively, are input to adder 26 and added together, and an output video signal is generated.

The pixel information P8 of the generated output video signal is supplied to memory I/F30, and is written to memory area t of image memory 31, so that the information is used for generating the output video signal delayed by one frame, described above.

Coefficients output from signal level detecting circuit 46 will be described with reference to FIG. 14. A coefficient curve of gain control w coefficient K1' described with respect to the background art is also shown, as in FIG. 2.

Gain control coefficient K1 for controlling the gain of GCA circuit 1 changes in the similar manner as the coefficient curve of gain control coefficient K1' obtained when the video signal is amplified only by the AGC circuit shown in FIG. 15, to a certain brightness, when the brightness gradually changes from bright to dark.

Figure 14:
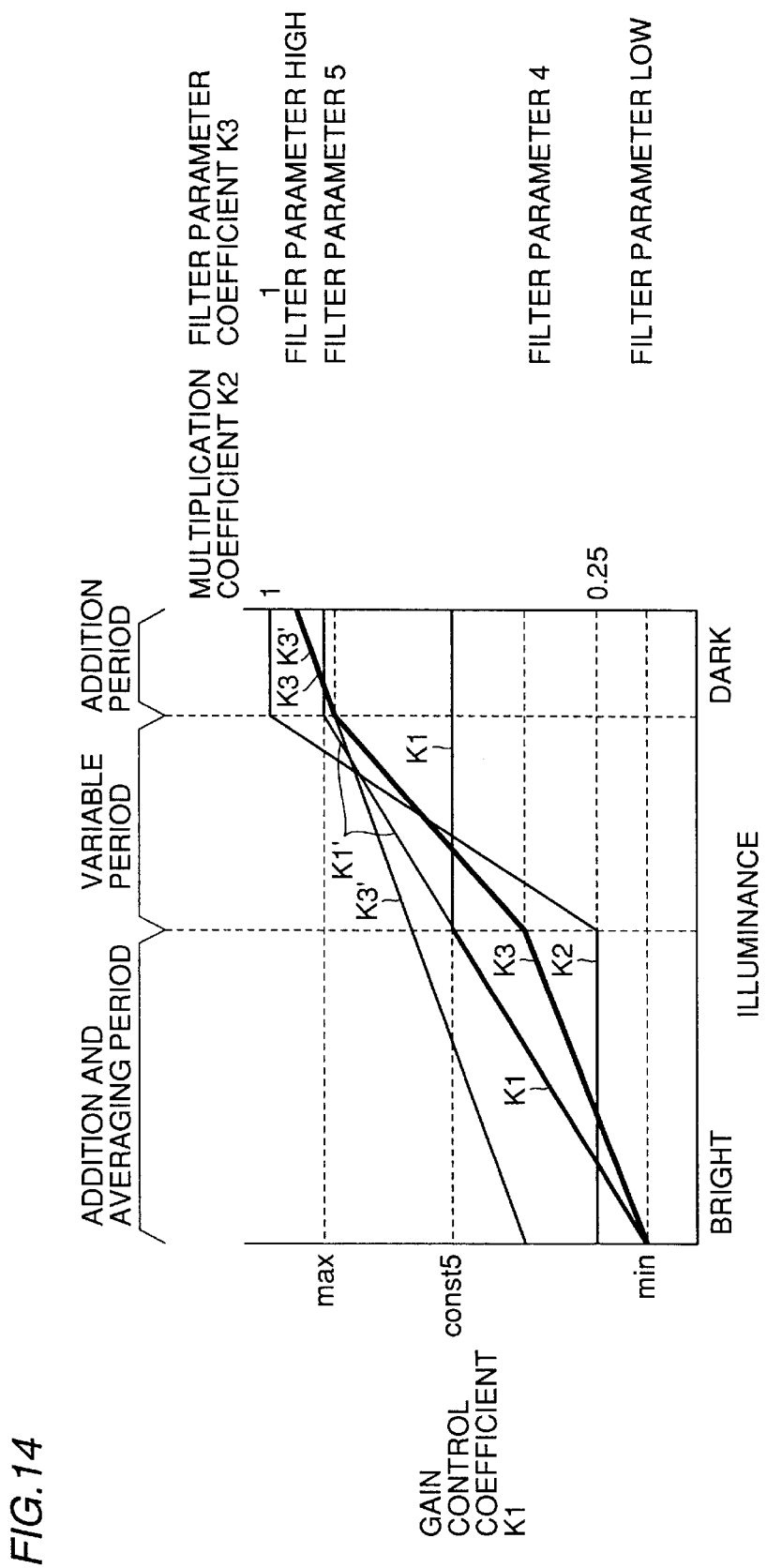
FIG. 14 represents changing characteristics of gain control coefficient K1, multiplication coefficient K2 and filter parameter coefficient K3 generated by the signal level detecting circuit 3 with respect to illuminance, in the video signal processing apparatus in accordance with the seventh embodiment of the present invention.

The certain brightness refers to that brightness at which the signal level attains four times the signal level amplifiable with gain control coefficient K1' being max, and the gain control coefficient K1 at that time is K1=const5, as can be seen from FIG. 14.

Even when the illuminance becomes darker from here, gain control coefficient K1=const5 is maintained, and therefore the signal level attains lower.

Next, the change in multiplication coefficient K2 which is input to multiplier 9 and multiplexed by the video signal S11 which results from addition by accumulation adder 16, when the illuminance gradually changes from bright to dark will be described.

To a certain brightness, multiplication coefficient is not changed but constant at K2=0.25. The multiplication coefficient K2=0.25 means ¼. Namely, this coefficient represents addition and averaging process performed by accumulation adder 16 and multiplier 9, and the period in which the coefficient is kept constant will be referred to as addition and averaging period as in the case of FIG. 2.

The certain brightness refers to that brightness at which gain control coefficient K1=const5, as can be seen from FIG. 14.

As the illuminance becomes darker from here, multiplication coefficient K2 increases, until multiplication coefficient K2 attains 1 when a signal level detected by signal level detecting circuit 46 attains to a certain constant value.

The time when "the signal level detected by the signal level detecting circuit 46 attains to a certain constant value" refers to the time when the gain control coefficient K1' when the video signal is amplified only by the AGC circuit shown in FIG. 15 attains to K1'=max, as is apparent from FIG. 14.

The multiplication coefficient K2 is variable from 0.25 to 1, and therefore this period is referred to as variable period as in the case of FIG. 2.

When the brightness becomes still darker, multiplication coefficient K2 is maintained constant at K2=1, and multiplication coefficient K2 does not change any more even when the illuminance becomes darker.

That the multiplication coefficient K2 is K2=1 means that the signal level is not changed by multiplier 9 and only the addition process of four frames is performed by accumulation adder 16. Therefore, this period is referred to as addition period as in the case of FIG. 2.

Next, change in filter parameter control coefficient K3 input to coefficient control unit 23 of frame cyclic noise reduction circuit 45 when the illuminance changes from bright to dark gradually will be described.

To a certain brightness, filter parameter control coefficient K3 increases at a constant rate of increase from filter parameter LOW to filter parameter 4.

The certain brightness refers to the brightness where gain control coefficient K1 attains K1=const5 as shown in FIG. 11, and the period until illuminance attains to the certain brightness corresponds to the addition and averaging period described with reference to the video signal processing apparatus in accordance with the first embodiment.

When the illuminance attains darker, filter parameter control coefficient K3 increases from filter parameter 4 to filter parameter 5 when the signal level detected by signal level detecting circuit 46 attains to a prescribed value, at a higher rate of increase than in the addition and averaging period.

"When the signal level detected by the signal level detecting circuit 46 attains to a prescribed value" means the time when the gain control coefficient K1' (gain control coefficient obtained when the video signal is amplified by AGC circuit only) described with reference to the video signal processing apparatus in accordance with the first embodiment attains to K1'=max, as is apparent from FIG. 14. The variable period of the present embodiment is the same as the variable period described with reference to the video signal processing apparatus in accordance with the first embodiment.

When the illuminance attains still darker, filter parameter control coefficient K3 increases from filter parameter 5 to filter parameter HIGH, at the same rate of increase as in the addition and averaging period.

This period of change is the same as the addition period described with reference to the video signal processing apparatus in accordance with the first embodiment.

The reason why the filter parameter control coefficient K3 has such a change characteristic will be described in the following.

The filter parameter control coefficient K3' shown in FIG. 14 is not intended to improve signal level by frame addition process such as implemented in the video signal processing apparatus in accordance with the first embodiment, that is, the noise characteristic when the effect of reducing noise component by addition and averaging process in the addition and averaging period and the variable period for improving low illuminance. More specifically, the filter parameter control coefficient K3' changes in accordance with the noise characteristic when the signal level is improved by the AGC circuit only, as described with reference to the background art. The filter parameter control coefficient with the effect of improvement in the signal level attained by frame addition process as in the video signal processing apparatus in accordance with the first embodiment subtracted, is applied to the filter parameter control coefficient K3. This is the reason why the filter parameter control coefficient K3 has such a characteristic as it changes, as described above.

As to the amount subtracted of the effect of signal level improvement attained by the frame addition method, the effect of improvement of the signal level attained by the four frame addition method in accordance with the video signal processing apparatus of the present embodiment is higher than the two frame addition method of the video signal processing apparatus in accordance with the fifth embodiment, and therefore larger amount can be subtracted, than in the two frame addition method of the video signal processing apparatus in accordance with the fifth embodiment.

In the addition and averaging period, similar to the operation of the video signal processing apparatus in accordance with the first embodiment, the signal level is kept constant as the gain control coefficient K1 changes, and the noise component is reduced as the addition and averaging process among frames is performed by the adder 16 and the multiplier 9.

Further, as the noise component is reduced by the addition and averaging process, the noise reduction circuit 45 operates to weaken the filter parameter of noise reduction circuit 45.

In the variable period, gain control coefficient K1 is constant at K1=const5, and the rate of increase does not change. Therefore, as the illuminance attains darker, the signal level becomes smaller, whereas the noise component is not amplified.

The multiplication coefficient K2 changes between 0.25 and 1. Therefore, by the addition and averaging process among frames, noise component is reduced while the signal level is improved.

As the noise component is reduced by the addition and averaging process in the variable period, noise reduction circuit 45 operates to weaken the filter parameter of noise reduction circuit 45.

In the addition period, addition among frames is performed, so that the signal level is improved to four times higher. Noise reduction circuit 45 operates such that the filter parameter of the noise reduction circuit 45 attain filter parameter HIGH. Thus the filter parameter of the noise reduction circuit 45 is automatically controlled.

The second scaling circuit 17 and the switching circuit 32 described above are necessary when the image size of the output video signal must be the same image size as the input video signal, as in the case of the video signal processing apparatus in accordance with the fourth embodiment. Therefore, if the video signal may have the image size scaled by the first scaling circuit 12, the second scaling circuit 17 and the switching circuit 32 are unnecessary.

In the video signal processing apparatus in accordance with the seventh embodiment, similar effects as obtained by the sixth embodiment can be obtained. Further, video signals reduced to 1/n in pixel number ratio can be generated, and adding and averaging process among n frames is performed in a relatively bright illuminance range. Therefore, noise component is reduced. Further, as the noise component is reduced by the addition and averaging process among n frames, the filter parameter of the noise reduction circuit can be made weaker. Therefore, afterimage or blurring generated as a time filter is applied even to motion pixels without frame correlation can further be reduced.

In a relatively dark illuminance range, adding and averaging process among n frames is performed. Thus, noise component is reduced while the signal level is improved.

Further, as the detected signal level becomes lower, it is possible to gradually increase filter parameter of the noise reduction circuit 45 to compensate for the decrease in noise reduction effect attained by the adding and averaging process among n frames. Therefore, decrease in noise reduction effect attained by the adding and averaging process can be compensated for by the noise reduction circuit 45.

In a still darker illuminance range, addition among n frames is performed, so that the signal level is improved. Further, the filter parameter of the noise reduction circuit 45 is maximized, and therefore the effect of noise component reduction which cannot be attained by the addition process can be assisted by the noise reduction circuit 45.

Therefore, the video signal level picked up at a low illuminance can be improved to n times higher, afterimage and blurring can be further suppressed, and noise component generated in the video signal can be suppressed even at a low illuminance, whereby good image quality is ensured.

Although the present invention has been described and illustrated in detail, it is clearly understood that the same is by way of illustration and example only and is not to be taken by way of imitation, the spirit and scope of the present invention being limited only by the terms of the appended claims.

What is claimed is:

1. A video signal processing apparatus, comprising:
    a video signal amplifying circuit amplifying an input video signal in accordance with a gain control coefficient, and outputting a video signal of a predetermined image size;
    a frame addition circuit connected to said video signal amplifying circuit and adding outputs of said video signal amplifying circuit by a predetermined number of frames;
    a first signal level detecting circuit connected to said video signal amplifying circuit and calculating said gain control coefficient and a multiplication coefficient in accordance with an output of said video signal amplifying circuit, wherein calculating said gain control coefficient and multiplication coefficient includes generating the gain control coefficient and the multiplication coefficient to provide an addition and averaging period, a variable period, and an addition period based upon an illuminance; and
    a first multiplier connected to said frame addition circuit and said first signal level detecting circuit, and receiving as inputs an output of said frame addition circuit and said multiplication coefficient.

2. The video signal processing apparatus according to claim 1, wherein
    said frame addition circuit includes
        a first image memory of at least one frame of video signals connected to said video signal amplifying circuit, and
        a first adder connected to said video signal amplifying circuit and said image memory, and receiving as inputs an output of said video signal and said video signal stored in said image memory.

3. The video signal processing apparatus according to claim 2, wherein
    said frame addition circuit further includes
        a second image memory of one frame of video signals connected to said first image memory, and
        a second adder connected to said first adder and said second image memory, receiving as inputs an output of said first adder and said video signal stored in said second image memory.

4. The video signal processing apparatus according to claim 2, wherein
    said first signal level detecting circuit additionally calculates a first filter parameter coefficient, in accordance with an output of said video signal amplifying circuit;
    said video signal processing apparatus further comprising
        a noise reduction circuit connected to said first multiplier and said first signal level detecting circuit and performing noise reduction of an output of said first multiplier in accordance with an output of said first multiplier and said first filter parameter coefficient.

5. The video signal processing apparatus according to claim 4, wherein
    said noise reduction circuit includes
        a motion detection circuit connected to said first multiplier and detecting amount of change in motion of said video signal from an output of said first multiplier,
        a coefficient control unit connected to said motion detection circuit and said second signal level detecting circuit, and outputting second and third filter parameter coefficients in accordance with said amount of change in motion and said first filter parameter coefficient,
        a second multiplier connected to said first multiplier and said coefficient control unit, and receiving as inputs an output of said first multiplier and said second filter parameter coefficient,
        a second image memory holding an output video signal,
        a third multiplier connected to said coefficient control unit and said second image memory and receiving as inputs said third filter parameter coefficient and said output video signal, and
        a second adder connected to said second and third multipliers, receiving as inputs outputs of said second and third multipliers and outputting said output video signal.

6. The video signal processing apparatus according to claim 4, wherein
    said first image memory includes a second image memory connected to said video signal amplifying circuit and holding an output of said video signal amplifying circuit and an output video signal; and
    said noise reduction circuit includes
        a motion detection circuit connected to said first multiplier and detecting an amount of change in motion of said video signal from an output of said first multiplier,
        a coefficient control unit connected to said motion detection circuit and said second signal level detecting circuit, and outputting second and third filter parameter coefficients in accordance with said amount of change in motion and said first filter parameter coefficient,
        a second multiplier connected to said first multiplier and said coefficient control unit and receiving as inputs an output of said first multiplier and said second filter parameter coefficient,
        a third multiplier connected to said coefficient control unit and said second image memory and receiving as inputs said third filter parameter coefficient and said output video signal, and
        a second adder connected to said second and third multipliers, receiving as inputs outputs of said second and third multipliers and outputting said output video signal.

7. The video signal processing apparatus according to claim 1, wherein said frame addition circuit includes
   a line memory for one line of video signals connected to said video signal amplifying circuit,
   an image memory for one frame of video signals connected to said video signal amplifying circuit,
   a first adder connected to said video signal amplifying circuit and said line memory, and receiving as inputs an output of said video signal amplifying circuit and said video signal stored in said line memory, and
   a second adder connected to said first adder and said image memory, and receiving as inputs an output of said first adder and said video signal stored in said image memory.

8. The video signal processing apparatus according to claim 1, wherein
   said video signal amplifying circuit includes
      an amplifying circuit amplifying input said video signal, and
      a first scaling circuit connected to said amplifying circuit and scaling image data constituted by an output of said amplifying circuit at a predetermined magnification; and
   said frame addition circuit includes
      a first image memory connected to said first scaling circuit and storing a predetermined number of outputs of said first scaling circuit, and
      an accumulation adder connected to said first scaling circuit and said first image memory, and accumulating and adding an output of said first scaling circuit and the predetermined number of outputs of said first scaling circuit stored in said first image memory.

9. The video signal processing apparatus according to claim 8, further comprising
   a second scaling circuit connected to said first multiplier and scaling an output of said first multiplier at a magnification which is a reciprocal number of said predetermined magnification.

10. The video signal processing apparatus according to claim 8, wherein said first signal level detecting circuit is connected to said first scaling circuit and additionally calculates a first filter parameter coefficient in accordance with an output of said first scaling circuit;
   said first image memory includes a second image memory connected to said first scaling circuit and holding an output of said first scaling circuit and an output video signal;
   said video signal processing apparatus further comprising
      a motion detection circuit connected to said first multiplier and detecting an amount of change in motion of said video signal from an output of said first multiplier;
      a coefficient control unit connected to said motion detection circuit and said first signal level detecting circuit and outputting second and third filter parameter coefficients in accordance with said amount of change in motion and said first filter parameter coefficient;
      a second multiplier connected to said first multiplier and said coefficient control unit and receiving as inputs an output of said first multiplier and said second filter parameter coefficient;
      a third multiplier connected to said coefficient control unit and said second image memory and receiving as inputs said third filter parameter coefficient and said output video signals; and
      an adder connected to said second and third multipliers, receiving as inputs outputs of said second and third multipliers and outputting said output video signal.

11. The video signal processing apparatus according to claim 10, further comprising
   a second scaling circuit connected to said adder and scaling an output of said adder at a magnification which is a reciprocal number of said predetermined magnification.

12. The video signal processing apparatus according to claim 1, wherein
   said first signal level detecting circuit additionally calculates a first filter parameter coefficient in accordance with an output of said video signal amplifying circuit;
   said video signal processing apparatus further comprising
      a noise reduction circuit connected to said first multiplier and said first signal level detecting circuit and performing noise reduction of an output of said first multiplier in accordance with an output of said first multiplier and said first filter parameter coefficient.

13. The video signal processing apparatus according to claim 12, wherein
   said noise reduction circuit includes
      a motion detection circuit connected to said first multiplier and detecting an amount of change in motion of said video signal from an output of said first multiplier,
      a coefficient control unit connected to said motion detection circuit and said second signal level detecting circuit, and outputting second and third filter parameter coefficients in accordance with said amount of change in motion and said first filter parameter coefficient,
      a second multiplier connected to said first multiplier and said coefficient control unit, and receiving as inputs an output of said first multiplier and said second filter parameter coefficient,
      an image memory holding an output video signal,
      a third multiplier connected to said coefficient control unit and said image memory, and receiving as inputs said third filter parameter coefficient and said output video signal, and
      an adder connected to said second and third multipliers, receiving as inputs output of said second and third multipliers and outputting said output video signal.

* * * * *

UNITED STATES PATENT AND TRADEMARK OFFICE
CERTIFICATE OF CORRECTION

PATENT NO. : 6,542,202 B2
DATED : April 1, 2003
INVENTOR(S) : Mitsuhiko Takeda and Mamoru Oda It is certified that error appears in the above-identified patent and that said Letters Patent is hereby corrected as shown below:

<u>Title page,</u>
Item [30], Foreign Application Priorty Data, please correct as follows:
-- Sep. 30, 1998 (JP) .................................. 10-276784(P) --

Signed and Sealed this

Twenty-eighth Day of October, 2003

JAMES E. ROGAN
*Director of the United States Patent and Trademark Office*